(12) United States Patent
Rothberg et al.

(10) Patent No.: US 11,048,334 B2
(45) Date of Patent: Jun. 29, 2021

(54) METHODS AND APPARATUSES FOR IDENTIFYING GESTURES BASED ON ULTRASOUND DATA

(71) Applicant: Butterfly Network, Inc., Guilford, CT (US)

(72) Inventors: Jonathan M. Rothberg, Guilford, CT (US); Tyler S. Ralston, Clinton, CT (US); Nathan Silberman, Brooklyn, NY (US)

(73) Assignee: Butterfly Network, Inc., Guilford, CT (US)

( * ) Notice: Subject to any disclaimer, the term of this patent is extended or adjusted under 35 U.S.C. 154(b) by 0 days.

(21) Appl. No.: 16/229,765

(22) Filed: Dec. 21, 2018

(65) Prior Publication Data
US 2019/0196600 A1 Jun. 27, 2019

Related U.S. Application Data

(60) Provisional application No. 62/609,600, filed on Dec. 22, 2017.

(51) Int. Cl.
*G06F 3/041* (2006.01)
*G06F 3/0346* (2013.01)
(Continued)

(52) U.S. Cl.
CPC ............ *G06F 3/017* (2013.01); *G06F 3/0346* (2013.01); *G06K 9/00335* (2013.01);
(Continued)

(58) Field of Classification Search
CPC ... G06F 3/017; G06F 3/0346; G06K 9/00335; G06K 9/00355; G06K 9/2018; G06K 9/6256; G06N 20/00
See application file for complete search history.

(56) References Cited

U.S. PATENT DOCUMENTS 10,386,481 B1 * 8/2019 Chen ...................... G01S 15/58
10,572,024 B1 * 2/2020 Saba ....................... G06F 3/011
(Continued)

OTHER PUBLICATIONS

International Search Report and Written Opinion dated Mar. 22, 2019 in connection with International Application No. PCT/US2018/067055.
(Continued)

*Primary Examiner* — Afroza Chowdhury
(74) *Attorney, Agent, or Firm* — Wolf, Greenfield & Sacks, P.C.

(57) ABSTRACT

Aspects of the technology described herein relate to methods and apparatuses for identifying gestures based on ultrasound data. Performing gesture recognition may include obtaining, with a wearable device, ultrasound data corresponding to an anatomical gesture; and identifying the anatomical gesture based on the obtained ultrasound data. Interfacing with a computing device may include identifying, with a wearable device, an anatomical gesture using ultrasound data obtained by the wearable device; and causing the computing device to perform a specific function based on the anatomical gesture identified by the wearable device. Training a wearable device to perform gesture recognition may include obtaining, with the wearable device, ultrasound data corresponding to an anatomical gesture; obtaining non-ultrasound data corresponding to the anatomical gesture; and training a machine learning model accessed by the wearable device to recognize the anatomical gesture based on correlating the non-ultrasound data and the ultrasound data.

20 Claims, 20 Drawing Sheets

(51) Int. Cl.
*G06K 9/00* (2006.01)
*G06N 20/00* (2019.01)
*G06F 3/01* (2006.01)
*G06K 9/62* (2006.01)
*G06K 9/20* (2006.01)

(52) U.S. Cl.
CPC ....... *G06K 9/00355* (2013.01); *G06K 9/2018* (2013.01); *G06K 9/6256* (2013.01); *G06N 20/00* (2019.01)

(56) References Cited

U.S. PATENT DOCUMENTS

| | | |
|---|---|---|
| 2011/0055447 A1 | 3/2011 | Costa |
| 2014/0288428 A1 | 9/2014 | Rothberg et al. |
| 2015/0323998 A1* | 11/2015 | Kudekar ................ G06F 1/163 345/156 |
| 2016/0048231 A1* | 2/2016 | Kristensson ........... G04G 21/00 345/177 |
| 2017/0052596 A1 | 2/2017 | Li |
| 2017/0123487 A1 | 5/2017 | Hazra et al. |
| 2017/0360397 A1 | 12/2017 | Rothberg et al. |
| 2017/0360401 A1 | 12/2017 | Rothberg et al. |

OTHER PUBLICATIONS

McIntosh et al., EchoFlex: Hand Gesture Recognition using Ultrasound Imaging. Proceedings of the 2017 CHI Conference on Human Factors in Computing Systems. ACM. 2017; 1923-1934.

International Preliminary Report on Patentability dated Jul. 2, 2020 in connection with International Application No. PCT/US2018/067055.

* cited by examiner

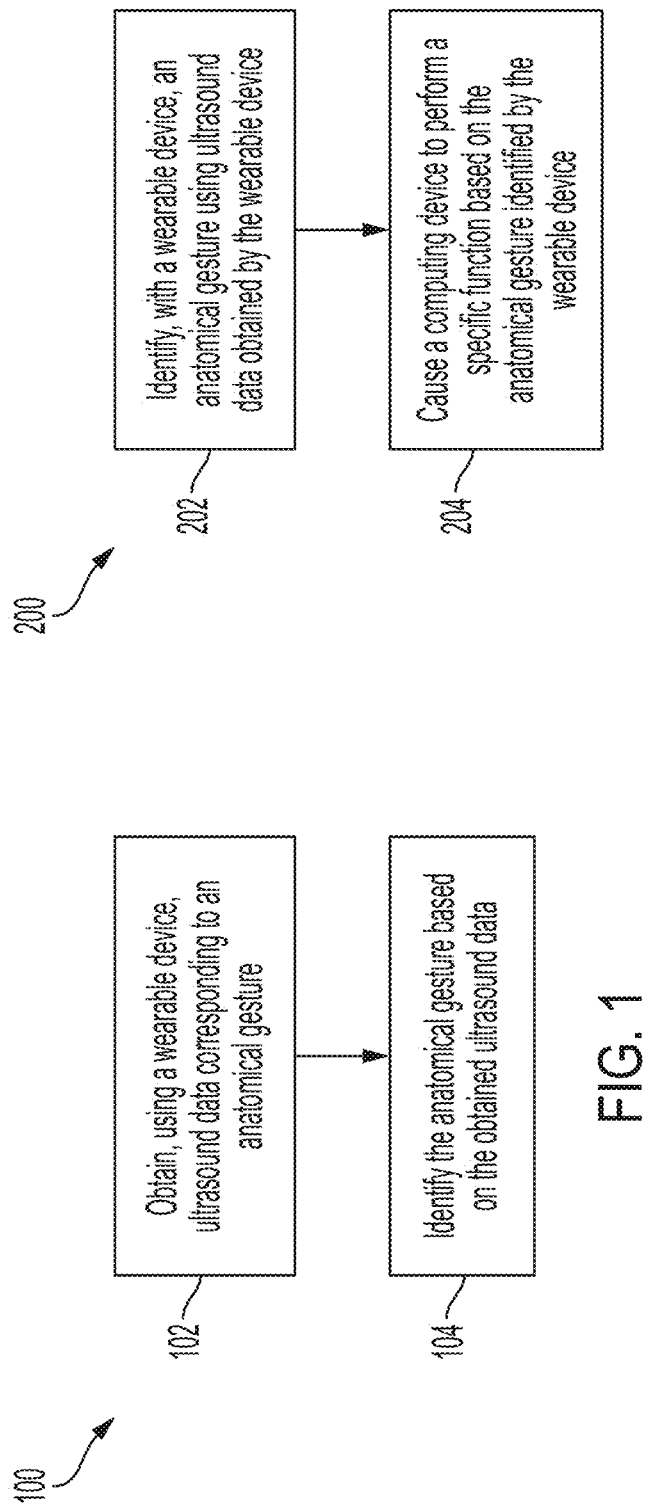

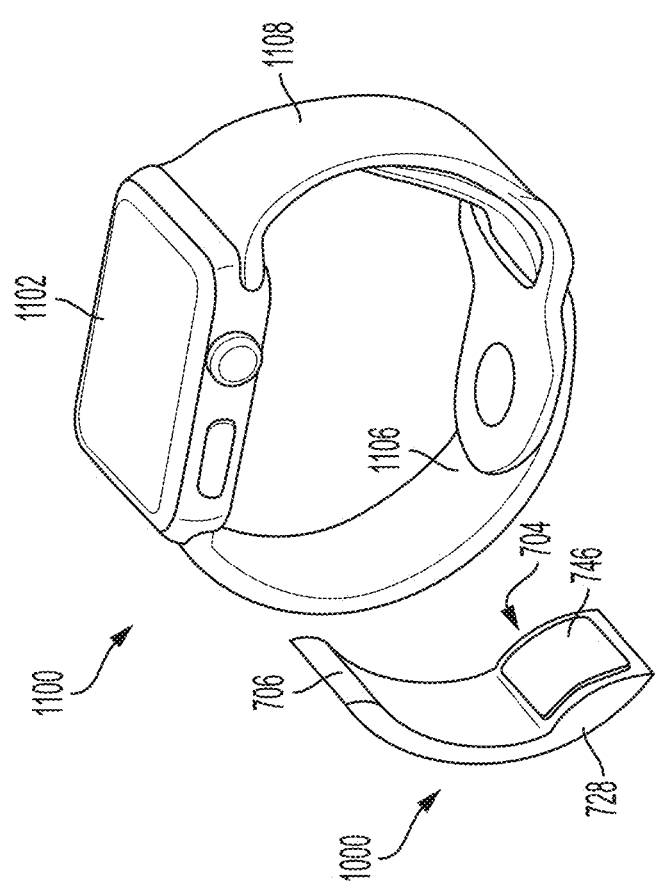

METHODS AND APPARATUSES FOR IDENTIFYING GESTURES BASED ON ULTRASOUND DATA

The present application claims the benefit under 35 U.S.C. § 119(e) of U.S. Provisional Patent Application Ser. No. 62/609,600, filed Dec. 22, 2017, and entitled "METHODS AND APPARATUSES FOR IDENTIFYING GESTURES BASED ON ULTRASOUND DATA," which is hereby incorporated herein by reference in its entirety.

FIELD

The disclosed embodiments generally relate to ultrasound data collection. Some aspects relate to identifying gestures based on ultrasound data.

BACKGROUND

Ultrasound devices may be used to collect ultrasound data, using sound waves with frequencies that are higher with respect to those audible to humans. When pulses of ultrasound are transmitted into tissue (e.g., by using a probe), sound waves are reflected off the tissue with different tissues reflecting varying degrees of sound. These reflected sound waves may then be recorded. The strength (amplitude) of the sound signal and the time it takes for the wave to travel through the body may provide information about the insonated tissues.

SUMMARY

According to one aspect, a method of training a wearable device to perform gesture recognition includes obtaining, with the wearable device, ultrasound data corresponding to an anatomical gesture; obtaining non-ultrasound data corresponding to the anatomical gesture; and training a machine learning model accessed by the wearable device to recognize the anatomical gesture based on correlating the non-ultrasound data and the ultrasound data.

In some embodiments, the wearable device includes one of a wristwatch or a wristband. In some embodiments, the wearable device further includes an ultrasound-on-a-chip device. In some embodiments, the wearable device further includes one or more position sensing devices. In some embodiments, the one or more position sensing devices include one or more accelerometers, gyroscopes, magnetometers, compasses, and global positioning systems (GPS). In some embodiments, the method further includes obtaining the non-ultrasound data using the one or more position sensing devices. In some embodiments, the method further includes obtaining the non-ultrasound data using an image capture device. In some embodiments, the image capture device includes one of a camera, a smartphone, or a tablet device. In some embodiments, the anatomical gesture includes one of a hand gesture, a finger gesture, a wrist gesture and/or an arm gesture.

According to another aspect, a system for training a wearable device to perform gesture recognition includes processing circuitry configured to obtain, from the wearable device, ultrasound data corresponding to an anatomical gesture; obtain non-ultrasound data corresponding to the anatomical gesture; and train a machine learning model accessed by the wearable device to recognize the anatomical gesture based on correlating the non-ultrasound data and the ultrasound data.

In some embodiments, the wearable device includes one of a wristwatch or a wristband. In some embodiments, the wearable device further includes an ultrasound-on-a-chip device. In some embodiments, the wearable device further includes one or more position sensing devices. In some embodiments, the one or more position sensing devices include one or more accelerometers, gyroscopes, magnetometers, compasses, and global positioning systems (GPS). In some embodiments, the processing circuitry is further configured to obtain the non-ultrasound data using the one or more position sensing devices. In some embodiments, the processing circuitry is further configured to obtain the non-ultrasound data using an image capture device. In some embodiments, the image capture device includes one of a camera, a smartphone, or a tablet device. In some embodiments, the anatomical gesture includes one of a hand gesture, a finger gesture, a wrist gesture and/or an arm gesture.

According to another aspect, at least one non-transitory computer-readable storage medium stores processor-executable instructions that, when executed by at least one processor, cause the at least one processor to obtain, from a wearable device, ultrasound data corresponding to an anatomical gesture; obtain non-ultrasound data corresponding to the anatomical gesture; and train a machine learning model accessed by the wearable device to recognize the anatomical gesture based on correlating the non-ultrasound data and the ultrasound data.

In some embodiments, the wearable device includes one of a wristwatch or a wristband. In some embodiments, the wearable device further includes an ultrasound-on-a-chip device. In some embodiments, the wearable device further includes one or more position sensing devices. In some embodiments, the one or more position sensing devices include one or more accelerometers, gyroscopes, magnetometers, compasses, and global positioning systems (GPS). In some embodiments, the at least one non-transitory computer-readable storage medium further stores processor-executable instructions that, when executed by the at least one processor, cause the at least one processor to obtain the non-ultrasound data using the one or more position sensing devices. In some embodiments, the at least one non-transitory computer-readable storage medium further stores processor-executable instructions that, when executed by the at least one processor, cause the at least one processor to obtain the non-ultrasound data using an image capture device. In some embodiments, the image capture device includes one of a camera, a smartphone, or a tablet device. In some embodiments, the anatomical gesture includes one of a hand gesture, a finger gesture, a wrist gesture and/or an arm gesture.

According to another aspect, a method of performing gesture recognition includes obtaining, with a wearable device, ultrasound data corresponding to an anatomical gesture; and identifying the anatomical gesture based on the obtained ultrasound data.

In some embodiments, the wearable device includes one of a wristwatch or a wristband. In some embodiments, the wearable device further includes an ultrasound-on-a-chip device. In some embodiments, the wearable device further includes one or more position sensing devices. In some embodiments, the wearable device further includes one or more ultrasound transducers acoustically coupled to an anatomical feature on which the wearable device resides. In some embodiments, the one or more ultrasound transducers are configured to operate at a frequency range selected to acquire the ultrasound data from within the anatomical feature. In some embodiments, the wearable device further includes an ultrasound gel pad, configured to be disposed between the one or more ultrasound transducers and the anatomical feature on which the wearable device resides. In some embodiments, the wearable device further includes one or more ultrasound transducers disposed in an outward direction with respect to a first anatomical feature on which the wearable device resides. In some embodiments, the one or more ultrasound transducers are configured to operate at a frequency range selected to acquire the ultrasound data from a second anatomical feature on which the wearable device does not reside. In some embodiments, the anatomical gesture includes one of a hand gesture, a finger gesture, a wrist gesture and/or an arm gesture.

According to another aspect, an apparatus for performing gesture recognition includes a wearable device configured to obtain ultrasound data corresponding to an anatomical gesture; and identify the anatomical gesture based on the obtained ultrasound data. In some embodiments, the wearable device includes one of a wristwatch or a wristband. In some embodiments, the wearable device further includes an ultrasound-on-a-chip device. In some embodiments, the wearable device further includes one or more position sensing devices. In some embodiments, the wearable device further includes one or more ultrasound transducers acoustically coupled to an anatomical feature on which the wearable device resides. In some embodiments, the one or more ultrasound transducers are configured to operate at a frequency range selected to acquire the ultrasound data from within the anatomical feature. In some embodiments, the wearable device further includes an ultrasound gel pad, configured to be disposed between the one or more ultrasound transducers and the anatomical feature on which the wearable device resides. In some embodiments, the wearable device further includes one or more ultrasound transducers disposed in an outward direction with respect to a first anatomical feature on which the wearable device resides. In some embodiments, the one or more ultrasound transducers are configured to operate at a frequency range selected to acquire the ultrasound data from a second anatomical feature on which the wearable device does not reside. In some embodiments, the anatomical gesture includes one of a hand gesture, a finger gesture, a wrist gesture and/or an arm gesture.

According to another aspect, at least one non-transitory computer-readable storage medium stores processor-executable instructions that, when executed by at least one processor, cause the at least one processor to obtain, from a wearable device, ultrasound data corresponding to an anatomical gesture; and identify the anatomical gesture based on the obtained ultrasound data. In some embodiments, the wearable device includes one of a wristwatch or a wristband. In some embodiments, the wearable device further includes an ultrasound-on-a-chip device. In some embodiments, the wearable device further includes one or more position sensing devices. In some embodiments, the wearable device further includes one or more ultrasound transducers acoustically coupled to an anatomical feature on which the wearable device resides. In some embodiments, the one or more ultrasound transducers are configured to operate at a frequency range selected to acquire the ultrasound data from within the anatomical feature. In some embodiments, the wearable device further includes an ultrasound gel pad, configured to be disposed between the one or more ultrasound transducers and the anatomical feature on which the wearable device resides. In some embodiments, the wearable device further includes one or more ultrasound transducers disposed in an outward direction with respect to a first anatomical feature on which the wearable device resides. In some embodiments, the one or more ultrasound transducers are configured to operate at a frequency range selected to acquire the ultrasound data from a second anatomical feature on which the wearable device does not reside. In some embodiments, the anatomical gesture includes one of a hand gesture, a finger gesture, a wrist gesture and/or an arm gesture.

According to another aspect, a method of interfacing with a computing device includes identifying, with a wearable device, an anatomical gesture using ultrasound data obtained by the wearable device; and causing the computing device to perform a specific function based on the anatomical gesture identified by the wearable device.

In some embodiments, the computing device includes one of a smartphone, a tablet device, a computer, a virtual reality system, or the wearable device itself. In some embodiments, the wearable device includes one of a wristwatch or a wristband. In some embodiments, the wearable device further includes an ultrasound-on-a-chip device. In some embodiments, the wearable device further includes one or more ultrasound transducers acoustically coupled to an anatomical feature on which the wearable device resides. In some embodiments, the one or more ultrasound transducers are configured to operate at a frequency range selected to acquire the ultrasound data from within the anatomical feature. In some embodiments, the wearable device further includes an ultrasound gel pad, configured to be disposed between the one or more ultrasound transducers and the anatomical feature on which the wearable device resides. In some embodiments, the wearable device further includes one or more ultrasound transducers disposed in an outward direction with respect to a first anatomical feature on which the wearable device resides. In some embodiments, the one or more ultrasound transducers are configured to operate at a frequency range selected to acquire the ultrasound data from a second anatomical feature on which the wearable device does not reside. In some embodiments, the anatomical gesture includes one of a hand gesture, a finger gesture, a wrist gesture and/or an arm gesture.

According to another aspect, an apparatus for interfacing with a computing device includes a wearable device configured to identify an anatomical gesture using ultrasound data obtained by the wearable device; and cause the computing device to perform a specific function based on the anatomical gesture identified by the wearable device.

In some embodiments, the computing device includes one of a smartphone, a tablet device, a computer, a virtual reality system, or the wearable device itself. In some embodiments, the wearable device includes one of a wristwatch or a wristband. In some embodiments, the wearable device further includes an ultrasound-on-a-chip device. In some embodiments, the wearable device further includes one or more ultrasound transducers acoustically coupled to an anatomical feature on which the wearable device resides. In some embodiments, the one or more ultrasound transducers are configured to operate at a frequency range selected to acquire the ultrasound data from within the anatomical feature. In some embodiments, the wearable device further includes an ultrasound gel pad, configured to be disposed between the one or more ultrasound transducers and the anatomical feature on which the wearable device resides. In some embodiments, the wearable device further includes one or more ultrasound transducers disposed in an outward direction with respect to a first anatomical feature on which the wearable device resides. In some embodiments, the one or more ultrasound transducers are configured to operate at a frequency range selected to acquire the ultrasound data from a second anatomical feature on which the wearable device does not reside. In some embodiments, the anatomical gesture includes one of a hand gesture, a finger gesture, a wrist gesture and/or an arm gesture.

According to another aspect, at least one non-transitory computer-readable storage medium stores processor-executable instructions that, when executed by at least one processor, cause the at least one processor to identify, with a wearable device, an anatomical gesture using ultrasound data obtained by the wearable device; and cause a computing device to perform a specific function based on the anatomical gesture identified by the wearable device.

In some embodiments, the computing device includes one of a smartphone, a tablet device, a computer, a virtual reality system, or the wearable device itself. In some embodiments, the wearable device includes one of a wristwatch or a wristband. In some embodiments, the wearable device further includes an ultrasound-on-a-chip device. In some embodiments, the wearable device further includes one or more ultrasound transducers acoustically coupled to an anatomical feature on which the wearable device resides. In some embodiments, the one or more ultrasound transducers are configured to operate at a frequency range selected to acquire the ultrasound data from within the anatomical feature. In some embodiments, the wearable device further includes an ultrasound gel pad, configured to be disposed between the one or more ultrasound transducers and the anatomical feature on which the wearable device resides. In some embodiments, the wearable device further includes one or more ultrasound transducers disposed in an outward direction with respect to a first anatomical feature on which the wearable device resides. In some embodiments, the one or more ultrasound transducers are configured to operate at a frequency range selected to acquire the ultrasound data from a second anatomical feature on which the wearable device does not reside. In some embodiments, the anatomical gesture includes one of a hand gesture, a finger gesture, a wrist gesture and/or an arm gesture.

BRIEF DESCRIPTION OF THE DRAWINGS

Various aspects and embodiments will be described with reference to the following exemplary and non-limiting figures. It should be appreciated that the figures are not necessarily drawn to scale. Items appearing in multiple figures are indicated by the same or a similar reference number in all the figures in which they appear.

FIG. 1 shows an example process for performing gesture recognition in accordance with certain embodiments described herein;

FIG. 2 shows an example process for interfacing with a computing device in accordance with certain embodiments described herein;

FIGS. 11A-11G show examples of a wearable device for ultrasound data collection configured to be bound to a user's wrist when the wearable device is assembled and worn;

DETAILED DESCRIPTION

Figure 3:
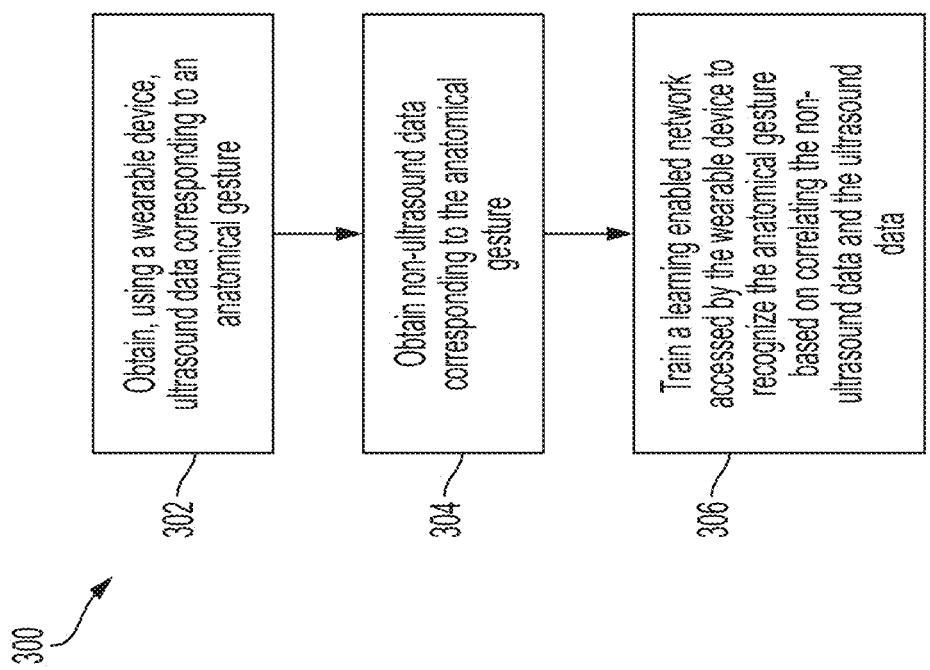
FIG. 3 shows an example process for training a wearable device to perform gesture recognition in accordance with certain embodiments described herein.

Conventional ultrasound systems are large, complex, and expensive systems that are typically only purchased by large medical facilities with significant financial resources. Recently, cheaper and less complex ultrasound imaging devices have been introduced. Such imaging devices may include ultrasonic transducers monolithically integrated onto a single semiconductor die to form a monolithic ultrasound device. Aspects of such ultrasound-on-a chip devices are described in U.S. patent application Ser. No. 15/415,434 titled "UNIVERSAL ULTRASOUND DEVICE AND RELATED APPARATUS AND METHODS," filed on Jan. 25, 2017 (and assigned to the assignee of the instant application), which is incorporated by reference herein in its entirety. The reduced cost and increased portability of these new ultrasound devices may make them significantly more accessible to the general public than conventional ultrasound devices. Furthermore, the portability of these new ultrasound devices makes them suitable for incorporation into wearable devices that can collect ultrasound data.

The inventors have recognized that such wearable devices may be suitable for use in gesture recognition. Gestures made by, for example, a user's fingers, hands, wrists, and arms on a particular upper limb may cause changes in muscles in that particular upper limb. These changes in muscles may be reflected in ultrasound data/images collected from that particular limb. The changes in muscles caused by a gesture by one portion of the upper limb may even be reflected in ultrasound data/images collected from another portion of the upper limb. For example, pointing a finger on a particular upper limb may cause changes in muscles that are reflected in ultrasound data/images collected at the wrist of the particular upper limb. Different gestures may cause different changes in muscles that in turn may cause differences in ultrasound data/images collected when the different gestures are performed. The differences in ultrasound data/images collected when the different gestures are performed can be used to distinguish between different gestures. In other words, specific features of ultrasound data/images may be used to identify the anatomical gesture performed when the ultrasound data/images are collected. This disclosure discusses wearable devices which are configured to collect ultrasound data from a user and to identify a gesture being performed by the user.

As used herein, an object configured to be bound to an anatomical structure should be understood to mean that the object is configured to remain located at or near the anatomical structure without external application of force. For example, an ultrasound-on-a-chip device coupled to a wristwatch or a bracelet that is worn on a user's wrist may be considered "wrist bound."

As used herein, an "ultrasound-on-a-chip device" should be understood to mean a device including ultrasound transducers (e.g., micromachined ultrasound transducers) integrated with a semiconductor die containing integrated circuitry.

As used herein, "ultrasound data" should be understood to refer to any of raw acoustical data, raw acoustical data that has been converted into another form, and ultrasound images generated based on raw acoustical data.

It should be appreciated that the embodiments described herein may be implemented in any of numerous ways. Examples of specific implementations are provided below for illustrative purposes only. It should be appreciated that these embodiments and the features/capabilities provided may be used individually, all together, or in any combination of two or more, as aspects of the technology described herein are not limited in this respect.

FIG. 1 shows an example process 100 for performing gesture recognition in accordance with certain embodiments described herein. The process 100 may be performed by, for example, processing circuitry in a wearable device. Examples of wearable devices will be discussed below with reference to FIGS. 7-15.

In act 102, the wearable device may obtain ultrasound data corresponding to an anatomical gesture. For example, a user may perform an anatomical gesture with a portion of a particular limb (e.g., fingers, hand, wrist, arm) and simultaneously collect ultrasound data from that same limb (at a different location that the portion of the limb performing the gesture, or at the same location) using a wearable device residing on that limb. In one embodiment, the wearable device may include one or more ultrasound transducers acoustically coupled to an anatomical feature of the limb on which the wearable device resides, and the ultrasound transducers may be configured to operate at a frequency range selected to acquire ultrasound data from within the anatomical feature on which the wearable device resides. For example, the user may perform a gesture with a finger on his/her left hand, and a wearable device residing on the user's left wrist and having ultrasound transducers facing towards the user's left wrist may collect ultrasound data from within the user's left wrist that is indicative of the gesture made with the finger on the user's left hand. Such ultrasound data collection may use frequencies in the megahertz range, for example, to collect ultrasound data from within the anatomical feature on which the wearable device resides. The ultrasound transducers may be acoustically coupled to the limb on which the wearable device resides by a coupling element (e.g., an ultrasound gel pad) disposed between the ultrasound transducers and the anatomical feature on which the wearable device resides. In another embodiment, the wearable device may include one or more ultrasound transducers disposed in an outward direction with respect to the anatomical feature of the limb on which the wearable device resides, and the ultrasound transducers may be configured to transmit ultrasound signals over the air to collect ultrasound data from an anatomical feature on which the wearable device does not reside, but which is on the same limb as the limb on which the wearable device resides. For example, the user may perform a gesture with a finger on his/her left hand, and a wearable device residing on the user's left wrist and having ultrasound transducers facing away from the user's left wrist may collect ultrasound data from the finger on the user's left hand that is indicative of the gesture made with the finger on the user's left hand. The ultrasound transducers may be configured to operate at a frequency range selected to acquire ultrasound data from the limb over air. Such over-the-air ultrasound imaging may use frequencies in the kilohertz range, for example. In embodiments in which a wrist-bound wearable device's ultrasound transducers are configured to transmit ultrasound signals over the air to collect ultrasound data from the limb on which the wearable device resides, the wearable device may reside on the dorsal wrist or the volar wrist. Certain gestures may be easier to detect in such embodiments when the wearable device resides on the dorsal wrist or the volar wrist. For example, gestures in which the hand or fingers bend towards the dorsal wrist may be easier to detect when the wearable device resides on the dorsal wrist, and gestures in which the hand or fingers bend towards the volar wrist may be easier to detect when the wearable device resides on the volar wrist. In another embodiment, the wearable device may include one or more ultrasound transducers disposed in an outward direction with respect to the anatomical feature of the limb on which the wearable device resides, and the ultrasound transducers may be configured to transmit ultrasound signals over the air to collect ultrasound data from an anatomical feature on which the wearable device does not reside and which is on the opposite limb as the limb on which the wearable device resides. For example, the user may perform a gesture with a finger on his/her right hand, and a wearable device residing on the user's left wrist and having ultrasound transducers facing away from the user's left wrist, may collect ultrasound data from the finger on the user's right hand that is indicative of the gesture made with the finger on the user's right hand. The user may point the ultrasound transducers on the left wrist towards the right hand in order to collect this ultrasound data. The ultrasound transducers may be configured to operate at a frequency range selected to acquire ultrasound data from the anatomical feature of the other limb. Such over-the-air ultrasound imaging may use frequencies in the kilohertz range, for example.

In act 104, the wearable device may identify the anatomical gesture based on the obtained ultrasound data. As discussed above, different gestures may cause different changes in muscles that in turn cause differences in ultrasound data/images collected when the different gestures are performed. In some embodiments, the wearable device may use machine learning models (e.g., learning enabled networks) to identify the anatomical gesture based on the obtained ultrasound data. For example, processing circuitry in the wearable device may access a machine learning model stored on internal memory circuitry or stored on memory circuitry located at another device, such as a smartphone, tablet device, laptop, or remote server(s), to identify the anatomical gesture. When accessing a machine learning model on another device, the wearable device may transmit ultrasound data to the other device and receive from the other device an indication of the gesture that has been identified using the machine learning model. Further examples of deep learning techniques will be discussed below with reference to FIG. 6. Further discussion of identifying gestures based on ultrasound data can be found in McIntosh, Jess, et al. "EchoFlex: Hand Gesture Recognition using Ultrasound Imaging," *Proceedings of the* 2017 *CHI Conference on Human Factors in Computing Systems*, ACM, 2017, which is incorporated by reference herein in its entirety.

Example gestures involving finger movements that the wearable device may be configured to identify include pointing with any finger or combination of fingers, pinching together any two or more fingers, tapping with any finger or combination of fingers (where the tapping may be on a physical surface or a tapping motion performed in air), counting (i.e., extending any number of fingers as is conventionally done while counting), blooming (i.e., holding any combination of fingers pinched together or in a fist and then extending the fingers outwards), or snapping. Example gestures involving hand or wrist movements that the wearable device may be configured to identify include clapping, chopping, waving, or orienting the hand in a specific direction. Example gestures involving arm movements that the wearable device may be configured to identify include pushing, pulling, punching, throwing, flinging, flapping, and swimming. It should be appreciated that these movements may include movements performed on an object (such as pushing and pulling an object) or simulating movements performed on an object without actually performing the movement on an object (such as simulating pushing and pulling an object without actually pushing or pulling an object).

In some embodiments, the wearable device may be configured to detect gestures performed on an object. For example, one gesture may be tapping one square in a grid and another gesture may be tapping another square in a grid. The wearable device may be configured to cause an electronic device to perform different functions in response to identifying that the user is tapping different squares. Portions of the user's hands/wrists/arms may be constrained during performance of these gestures to assist in differentiating ultrasound data corresponding to each gesture. For example, in the example of tapping squares on a grid, the user's wrist may be fixed at one location during the tapping.

In some embodiments, the wearable device may be configured to identify both a gesture type and a parameter. The parameter may be, for example, a distance, a direction, or a number. As particular examples, the wearable device may be configured to differentiate between pointing five fingers and pointing four fingers, or moving a hand across a small distance and moving a hand across a large distance.

In some embodiments, the wearable device may be configured to identify the gesture based on ultrasound data and non-ultrasound data. The non-ultrasound data may be, for example, data regarding the position of the wearable device, and may be obtained by position sensing devices in the wearable device, such as accelerometers, gyroscopes, magnetometers, compasses, and/or global positioning system (GPS) devices in the wearable device. The gesture may include one or more components identified based on ultrasound data and one or more components identified based on the non-ultrasound data. The gesture components identified based on the non-ultrasound data may include gesture components that do not cause changes in muscles that in turn cause changes in ultrasound data/images collected by the wearable device when the different gesture components are performed. For example, certain arm movements such as the motion of an arm swinging about an elbow may not cause changes in ultrasound data/images collected by a wrist-bound wearable device. Accordingly, for an example gesture that includes finger movement and arm swinging, the finger movement may be identified based ultrasound data and the arm swinging may be identified based on non-ultrasound data such as data regarding the position of the wearable device. The combined identification of the finger movement and arm swinging from the ultrasound data and non-ultrasound data may together serve to identify the overall gesture.

It should be appreciated that the wearable device may be configured to identify any gesture having any movement or combination of movements, and the gesture need not be constrained to a predefined type or gesture category or type. For example, the wearable device may be configured to identify a gesture created by a user.

FIG. 2 shows an example process 200 for interfacing with a computing device in accordance with certain embodiments described herein. The process 200 may be performed by, for example, processing circuitry in a wearable device. Examples of wearable devices will be discussed below with reference to FIGS. 7-15.

In act 202, the wearable device may identify an anatomical gesture using ultrasound data obtained by the wearable device. For example, a user may perform an anatomical gesture with a portion of a particular limb (e.g., fingers, hand, wrist, arm) and simultaneously collect ultrasound data from that same limb (at a different location that the portion of the limb performing the gesture, or at the same location) using a wearable device residing on that limb. In one embodiment, the wearable device may include one or more ultrasound transducers acoustically coupled to an anatomical feature of the limb on which the wearable device resides, and the ultrasound transducers may be configured to operate at a frequency range selected to acquire ultrasound data from within the anatomical feature on which the wearable device resides. For example, the user may perform a gesture with a finger on his/her left hand, and a wearable device residing on the user's left wrist and having ultrasound transducers facing towards the user's left wrist may collect ultrasound data from within the user's left wrist that is indicative of the gesture made with the finger on the user's left hand. Such ultrasound data collection may use frequencies in the megahertz range, for example, to collect ultrasound data from within the anatomical feature on which the wearable device resides. The ultrasound transducers may be acoustically coupled to the limb on which the wearable device resides by a coupling element (e.g., an ultrasound gel pad) disposed between the ultrasound transducers and the anatomical feature on which the wearable device resides. In another embodiment, the wearable device may include one or more ultrasound transducers disposed in an outward direction with respect to the anatomical feature of the limb on which the wearable device resides, and the ultrasound transducers may be configured to transmit ultrasound signals over the air to collect ultrasound data from an anatomical feature on which the wearable device does not reside, but which is on the same limb as the limb on which the wearable device resides. For example, the user may perform a gesture with a finger on his/her left hand, and a wearable device residing on the user's left wrist and having ultrasound transducers facing away from the user's left wrist may collect ultrasound data from the finger on the user's left hand that is indicative of the gesture made with the finger on the user's left hand. The ultrasound transducers may be configured to operate at a frequency range selected to acquire ultrasound data from the limb over air. Such over-the-air ultrasound imaging may use frequencies in the kilohertz range, for example. In embodiments in which a wrist-bound wearable device's ultrasound transducers are configured to transmit ultrasound signals over the air to collect ultrasound data from the limb on which the wearable device resides, the wearable device may reside on the dorsal wrist or the volar wrist. Certain gestures may be easier to detect in such embodiments when the wearable device resides on the dorsal wrist or the volar wrist. For example, gestures in which the hand or fingers bend towards the dorsal wrist may be easier to detect when the wearable device resides on the dorsal wrist, and gestures in which the hand or fingers bend towards the volar wrist may be easier to detect when the wearable device resides on the volar wrist. In another embodiment, the wearable device may include one or more ultrasound transducers disposed in an outward direction with respect to the anatomical feature of the limb on which the wearable device resides, and the ultrasound transducers may be configured to transmit ultrasound signals over the air to collect ultrasound data from an anatomical feature on which the wearable device does not reside and which is on the opposite limb as the limb on which the wearable device resides. For example, the user may perform a gesture with a finger on his/her right hand, and a wearable device residing on the user's left wrist and having ultrasound transducers facing away from the user's left wrist, may collect ultrasound data from the finger on the user's right hand that is indicative of the gesture made with the finger on the user's right hand. The user may point the ultrasound transducers on the left wrist towards the right hand in order to collect this ultrasound data. The ultrasound transducers may be configured to operate at a frequency range selected to acquire ultrasound data from the anatomical feature of the other limb. Such over-the-air ultrasound imaging may use frequencies in the kilohertz range, for example.

As discussed above, different gestures may cause different changes in muscles that in turn cause differences in ultrasound data/images collected when the different gestures are performed. In some embodiments, the wearable device may use machine learning models (e.g., learning enabled networks) to identify the anatomical gesture based on the obtained ultrasound data. For example, processing circuitry in the wearable device may access a machine learning model stored on internal memory circuitry or stored on memory circuitry located at another device, such as a smartphone, tablet device, laptop, or remote server(s), to identify the anatomical gesture. When accessing a machine learning model on another device, the wearable device may transmit ultrasound data to the other device and receive from the other device an indication of the gesture that has been identified using the machine learning model. Further examples of deep learning techniques will be discussed below with reference to FIG. 6. Further examples of gestures that the wearable device may identify are discussed above with reference to FIG. 1. Additionally, as discussed above with reference to FIG. 1, certain gestures may be identified based on ultrasound data and non-ultrasound data.

In act 204, the wearable device my cause a computing device to perform a specific function based on the anatomical gesture identified by the wearable device. The computing device may be, for example, a smartphone, a tablet device, a computer, a virtual reality system, or the wearable device itself. To cause another computing device to perform a specific function, the wearable device may transmit signals over a wireless network using wireless communication circuitry (e.g., BLUETOOTH, ZIGBEE, and/or WiFi wireless communication circuitry) to the electronic device. For the wearable device to cause itself to perform a specific, the wearable device may generate internal signals within processing circuitry of the wearable device based on the gesture being performed. The wearable device may access a database (stored locally or at a remote device) containing associations between gestures and functions. Upon identifying a gesture, the wearable device may find the gesture in the database and cause the computing device to perform the function associated with the gesture in the database.

In some embodiments, in response to identifying specific gestures being performed, the wearable device may be configured to cause the electronic device to move a cursor on the display of the electronic device. For example, when a user moves his/her hand in a certain direction, the cursor may move in that direction across the display. In some embodiments, in response to identifying specific gestures, the wearable device may be configured to cause the electronic device to control keyboard input to the electronic device. For example, a user may simulate typing a sequence of letters on a keyboard that may not actually be present, and based on identifying those gestures, the sequence of letters may be input to the electronic device. As another example, in response to detecting a user performing sign language gestures corresponding to a sequence of letters, the wearable device may be configured to input the sequence of letters to the electronic device. In some embodiments, in response to identifying a user performing gestures corresponding to dancing (i.e., dance moves), the wearable device may be configured to cause an avatar of the user on a display screen of the electronic device to perform the same gestures on the display screen of the electronic device. In some embodiments, in response to identifying a user performing gestures corresponding to playing sports (e.g., throwing a ball, swinging a baseball ball or tennis racket or golf club, shooting a basketball, etc.), the wearable device may be configured to cause an avatar of the user to perform the same gestures on the display screen of the electronic device. In some embodiments, in response to identifying a user performing gestures corresponding to playing a music instrument (e.g., pressing keys on a piano, drumming, plucking strings on a guitar, etc.), the wearable device may be configured to cause an avatar of the user to perform the same gestures on the display screen of the electronic device. In some embodiments in which the electronic device is a virtual reality device, in response to identifying a user performing a certain gesture, the wearable device may be configured to cause the electronic device to replicate that gesture in a virtual world, or to perform some action corresponding to the gesture in the virtual world.

In some embodiments, the wearable device may be configured to identify both a gesture type and a parameter. The parameter may be, for example, a distance, a direction, or a number. In some embodiments, the wearable device may be configured to cause the electronic device to perform different functions in response to identifying the same gesture type, depending on the value of the parameter. For example, in response to identifying that a user is pointing five fingers, the wearable device may be configured to cause an electronic device to increase sound volume to a higher level than if the wearable device identifies that the user is pointing four fingers. As another example, in response to identifying that a user is moving his/her hand to the right, the wearable device may be configured to cause an electronic device to swipe a display screen to the right, while in response to identifying that the user is moving his/her hand to the left, the wearable device may be configured to cause the electronic device to swipe the display screen to the left. As another example, in response to identifying that the user is moving his/her hand across a large distance, the wearable device may be configured to cause an electronic device to scroll a screen down a farther distance than if the wearable device identified that the user is moving his/her hand across a small distance.

In some embodiments, the wearable device may be configured to cause an electronic device to perform a specific function based on detecting performance of a specific gesture. For example, in response to detecting that a user has five fingers raised, the wearable device may be configured to cause the electronic device to open a specific application. In some embodiments, the wearable device may be configured to cause an electronic device to perform a specific function based on detecting a transition from one gesture to another gesture. For example, in response to detecting that a user has transitioned from raising four fingers to raising five fingers, the wearable device may be configured to cause an electronic device to open one application, while in response to detecting that a user has transitioned from raising three fingers to raising five fingers, the wearable device may be configured to cause the electronic device to open another application.

FIG. 3 shows an example process 300 for training a wearable device to perform gesture recognition in accordance with certain embodiments described herein. The process 300 may be performed by, for example, processing circuitry in the wearable device and/or processing circuitry in another device or multiple devices in communication with the wearable device (e.g., a smartphone, tablet device, laptop, or one or more servers). Examples of wearable devices will be discussed below with reference to FIGS. 7-15.

In act 302, the processing circuitry may obtain, using the wearable device, ultrasound data corresponding to an anatomical gesture. For example, a user may perform an anatomical gesture with a portion of a particular limb (e.g., fingers, hand, wrist, arm) and simultaneously collect ultrasound data from that same limb (at a different location that the portion of the limb performing the gesture, or at the same location) using a wearable device residing on that limb. In one embodiment, the wearable device may include one or more ultrasound transducers acoustically coupled to an anatomical feature of the limb on which the wearable device resides, and the ultrasound transducers may be configured to operate at a frequency range selected to acquire ultrasound data from within the anatomical feature on which the wearable device resides. For example, the user may perform a gesture with a finger on his/her left hand, and a wearable device residing on the user's left wrist and having ultrasound transducers facing towards the user's left wrist may collect ultrasound data from within the user's left wrist that is indicative of the gesture made with the finger on the user's left hand. Such ultrasound data collection may use frequencies in the megahertz range, for example, to collect ultrasound data from within the anatomical feature on which the wearable device resides. The ultrasound transducers may be acoustically coupled to the limb on which the wearable device resides by a coupling element (e.g., an ultrasound gel pad) disposed between the ultrasound transducers and the anatomical feature on which the wearable device resides. In another embodiment, the wearable device may include one or more ultrasound transducers disposed in an outward direction with respect to the anatomical feature of the limb on which the wearable device resides, and the ultrasound transducers may be configured to transmit ultrasound signals over the air to collect ultrasound data from an anatomical feature on which the wearable device does not reside, but which is on the same limb as the limb on which the wearable device resides. For example, the user may perform a gesture with a finger on his/her left hand, and a wearable device residing on the user's left wrist and having ultrasound transducers facing away from the user's left wrist may collect ultrasound data from the finger on the user's left hand that is indicative of the gesture made with the finger on the user's left hand. The ultrasound transducers may be configured to operate at a frequency range selected to acquire ultrasound data from the limb over air. Such over-the-air ultrasound imaging may use frequencies in the kilohertz range, for example. In embodiments in which a wrist-bound wearable device's ultrasound transducers are configured to transmit ultrasound signals over the air to collect ultrasound data from the limb on which the wearable device resides, the wearable device may reside on the dorsal wrist or the volar wrist. Certain gestures may be easier to detect in such embodiments when the wearable device resides on the dorsal wrist or the volar wrist. For example, gestures in which the hand or fingers bend towards the dorsal wrist may be easier to detect when the wearable device resides on the dorsal wrist, and gestures in which the hand or fingers bend towards the volar wrist may be easier to detect when the wearable device resides on the volar wrist. In another embodiment, the wearable device may include one or more ultrasound transducers disposed in an outward direction with respect to the anatomical feature of the limb on which the wearable device resides, and the ultrasound transducers may be configured to transmit ultrasound signals over the air to collect ultrasound data from an anatomical feature on which the wearable device does not reside and which is on the opposite limb as the limb on which the wearable device resides. For example, the user may perform a gesture with a finger on his/her right hand, and a wearable device residing on the user's left wrist and having ultrasound transducers facing away from the user's left wrist, may collect ultrasound data from the finger on the user's right hand that is indicative of the gesture made with the finger on the user's right hand. The user may point the ultrasound transducers on the left wrist towards the right hand in order to collect this ultrasound data. The ultrasound transducers may be configured to operate at a frequency range selected to acquire ultrasound data from the anatomical feature of the other limb. Such over-the-air ultrasound imaging may use frequencies in the kilohertz range, for example.

In act 304, the processing circuitry may obtain non-ultrasound data corresponding to the anatomical gesture. The non-ultrasound data may be a label of the gesture (e.g., pointing, pinching, tapping, counting, blooming, snapping, clapping, chopping, waving, orienting, pushing, pulling, punching, throwing, flinging, flapping, and swimming). To obtain the non-ultrasound data, the wearable device or another electronic device may prompt the user by displaying a label of a gesture for the user, and collect ultrasound data corresponding to the gesture performed by the user (as discussed above with reference to act 302) in response to the prompt. The processing circuitry may then correlate the ultrasound data with the gesture label (i.e., the non-ultrasound data) that was prompted. In some embodiments, the wearable device or another computing device may display images or video of gestures for the user to perform. In some embodiments, another individual may demonstrate gestures for the user to perform. In embodiments in which the processing circuitry is external to the device that prompts the user, the processing circuitry may receive the gesture labels correlated with the ultrasound data over a wireless network.

In some embodiments, the wearable device may capture ultrasound data from the limb performing the gesture, as discussed above, while another electronic device may capture the non-ultrasound data. For example, a user may perform the gesture with one limb on which the wearable device resides, and the user may hold the electronic device with the hand on the other limb and capture the non-ultrasound data of the gesture being performed using the electronic device (e.g., as shown below in FIG. 4). The non-ultrasound data may be, for example, a two-dimensional or three-dimensional image or video of the anatomical gesture, where the image or video is captured using a different imaging modality than ultrasound imaging. The imaging modality may be, for example, standard optical imaging, radar imaging, or laser imaging. To capture the two-dimensional or three-dimensional image or video, an image capture device such as a smartphone, camera (i.e., a device whose primary purpose is capturing optical images), or tablet device with imaging sensors (e.g., standard camera sensors, radar imaging sensors, or laser imaging sensors) may be used. For capturing three-dimensional images/videos, in some embodiments the electronic device may include a structured illumination projector and a standard camera offset at least laterally from the structured illumination projector. In some embodiments, to collect three-dimensional images/videos of gestures being performed, the electronic device may include multiple standard cameras and use the multi-view stereo vision technique. The processing circuitry may then correlate the two-dimensional or three-dimensional images/videos with the ultrasound data. In embodiments in which the processing circuitry is external to the image capture device, the processing circuitry may receive the two-dimensional or three-dimensional images/videos correlated with the ultrasound data from the image capture device over a wireless network.

In some embodiments, to obtain a three-dimensional image of a gesture being performed, the image capture device may be configured to capture a two-dimensional image of the gesture being performed and input the two-dimensional image to a machine learning model (e.g., a learning enabled network). The machine learning model may be trained on correlations between two-dimensional and three-dimensional images of the same gesture being performed, and once trained may be able to transform an inputted two-dimensional image of a gesture to a three-dimensional image of the gesture. To assist in transforming the inputted two-dimensional image of a gesture to a three-dimensional image of the gesture, the machine learning model may use a three-dimensional model of the upper limb (or a portion thereof). The model may be used, for example, to infer the three-dimensional position and/or orientation of portions of the upper limb whose positions and/or orientations are obscured in the two-dimensional image.

In some embodiments, the non-ultrasound data may include data regarding the position of the wearable device. For example, when the user performs an anatomical gesture using the upper limb on which the wearable device resides, the position of the wearable device may change during performance of the gesture. The positional data for the wearable device may be obtained by position sensing devices, such as accelerometers, gyroscopes, magnetometers, compasses, and/or global positioning system (GPS) devices in the wearable device.

In some embodiments, the non-ultrasound data may include data regarding electrical muscle activity, such as data obtained with electromyography (EMG). The data regarding electrical muscle activity may be obtained by surface electrodes integrated in the wearable device (for example, if the wearable device is a wrist-bound device, the surface electrodes may be integrated into a wristband and/or into a primary module coupled to the wristband).

The ultrasound data obtained in act 302 and the non-ultrasound data obtained in act 304 may be considered training data. In act 306, the processing circuitry may train a machine learning model (e.g., a learning enabled network) accessed by the wearable device to recognize the anatomical gesture based on correlating the non-ultrasound data and the ultrasound data (i.e., the training data). The machine learning model may use, for example, one or more convolutional neural networks, one or more fully connected neural networks, random forests, support vector machines, linear classifiers, and/or other machine learning models. Example machine learning techniques are discussed further with reference to FIG. 6. In some embodiments, the machine learning model may be stored on memory circuitry within the wearable device. In other embodiments, the machine learning model may be stored on memory circuitry within another computing device (e.g., a smartphone, a tablet device, a laptop, or one more servers). In embodiments in which the processing circuitry is external to the device having the memory circuitry on which the machine learning model is stored, the processing circuitry may access the memory circuitry over a wireless network to train the machine learning model.

As discussed above, in some embodiments the non-ultrasound data may be a label of a gesture being performed. In such embodiments, the machine learning model may be trained on training data that includes correlations between ultrasound data collected when different anatomical gestures were performed and the labels of the different anatomical gestures. Once trained, the machine learning model may be configured to accept ultrasound data as an input and output a best guess as to the label of the gesture that was being performed when the ultrasound data was collected. In such embodiments, identifying a gesture includes identifying, based on ultrasound data, a label of a gesture that was performed.

As also discussed above, in some embodiments the non-ultrasound data may be a two-dimensional or three-dimensional image or video of the gesture being performed. To process the image/video for use as training data, in some embodiments one machine learning model may be used to model the relationship between ultrasound data and a parameterized model of the upper limb and a second machine learning model may be used to model the relationship between the parameterized model of the upper limb and a particular gesture. In particular, the first machine learning model may use a parameterized model of the upper limb in which the upper limb is modeled as a combination of parts (e.g., fingers, hand, wrist, etc.) each of which has one or more parameters (e.g., position, orientation, etc.) having a finite set of possible values. (It should be noted that the parameters of the model of the upper limb are not the same as any weights that may be applied to inputs or associated with edges in a neural network.) The first machine learning model may be trained to classify a gesture shown in an image/video by determining, based on the images/videos of the gesture, values for the model parameters corresponding to the gesture. For example, the first machine learning model may be trained on correlations between images/videos of gestures and corresponding model parameter values for the gestures. Once the images/video have been fit to model parameter values, correlations between model parameter values representing gestures and ultrasound data collected when the gestures were performed may be used as training data to train the second machine learning model. Once trained, the second machine learning model may be able to accept ultrasound data as an input and output a best guess as to model parameter values representing the gesture that was performed during collection of the ultrasound data. In contrast to the embodiment discussed above, in this embodiment, identifying a gesture includes identifying, based on ultrasound data, model parameter values representing the gesture that was performed.

In some embodiments, after training the machine learning model on training data including correlations between model parameter values representing a gesture and ultrasound data collected when the gesture was performed, the machine learning model may be able to recognize gestures that were not part of the training set. In other words, the machine learning model may be able to output, in response to inputted ultrasound data, a particular set of model parameter values representing a gesture even if that particular set of model parameter values was not part of the training data. For example, if the training data included model parameter values that represent pointing three fingers and pointing five fingers, the machine learning model may be able to output model parameter values that represent pointing four fingers. Accordingly, the number of gestures that the machine learning model can identify may be increased beyond the particular gestures included in the training set.

In some embodiments, capturing images/videos of gestures being performed may assist in generating training data. Rather than generating training data using the prompting method (i.e., correlating ultrasound data with a fixed number of gesture labels used to prompt a user to perform gestures), a user may perform a continuous sequence of unprompted upper limb movements, and two-dimensional or three-dimensional video of the sequence of movements as well as ultrasound data may be captured. Then, each frame of the video or a subset thereof, when fit to model parameter values, may be correlated with corresponding ultrasound data and used as training data. The number of frames of the video, each of which may potentially provide a training datapoint, may be greater than the fixed number of gesture labels used to prompt a user to perform gestures using the prompting method. Therefore, in this embodiment, the amount of training data generated may be greater than the amount of training data generated in embodiments employing the prompting method.

As discussed above, in some embodiments the non-ultrasound data may include positional data for the wearable device, obtained by position sensing devices. Such positional data may also be fit to model parameter values, and may therefore be used in similar ways as discussed above with regards to images/videos. Additionally, in embodiments in which the non-ultrasound data includes positional data for the wearable device, the non-ultrasound data and the ultrasound data may be used together as training data for identifying a gesture. For example, the training data may include a gesture including one or more components correlated with ultrasound data and one or more components correlated with non-ultrasound data. The gesture components correlated with the non-ultrasound data may include gesture components that do not cause changes in muscles that in turn cause changes in ultrasound data/images collected by the wearable device when the different gesture components are performed. For example, certain arm movements such as the motion of an arm swinging about an elbow may not cause changes in ultrasound data/images collected by a wrist-bound wearable device. Accordingly, for an example gesture that includes finger movement and arm swinging, the finger movement may be correlated with ultrasound data and the arm swinging may be correlated with non-ultrasound data such as data regarding the position of the wearable device.

In some embodiments, the machine learning model may be trained with data collected from a plurality of individuals, and the trained machine learning model may be pre-loaded onto the wearable device. In some embodiments, the machine learning model may be trained with data collected from the specific individual who will be using the wearable device. A combination of the two approaches is also possible. In particular, the machine learning model may be trained with data collected from a plurality of individuals, and then may be personalized based on training data from the specific individual who will be using the wearable device. To accomplish this personalization, techniques similar to those used to personalize machine learning models for speech recognition may be used. For example, training data may be clustered based on characteristics of the ultrasound data, and different machine learning models may be trained on the different clusters. The machine learning model corresponding to a cluster that matches characteristics of the particular user's ultrasound data may then be used.

Figure 4:
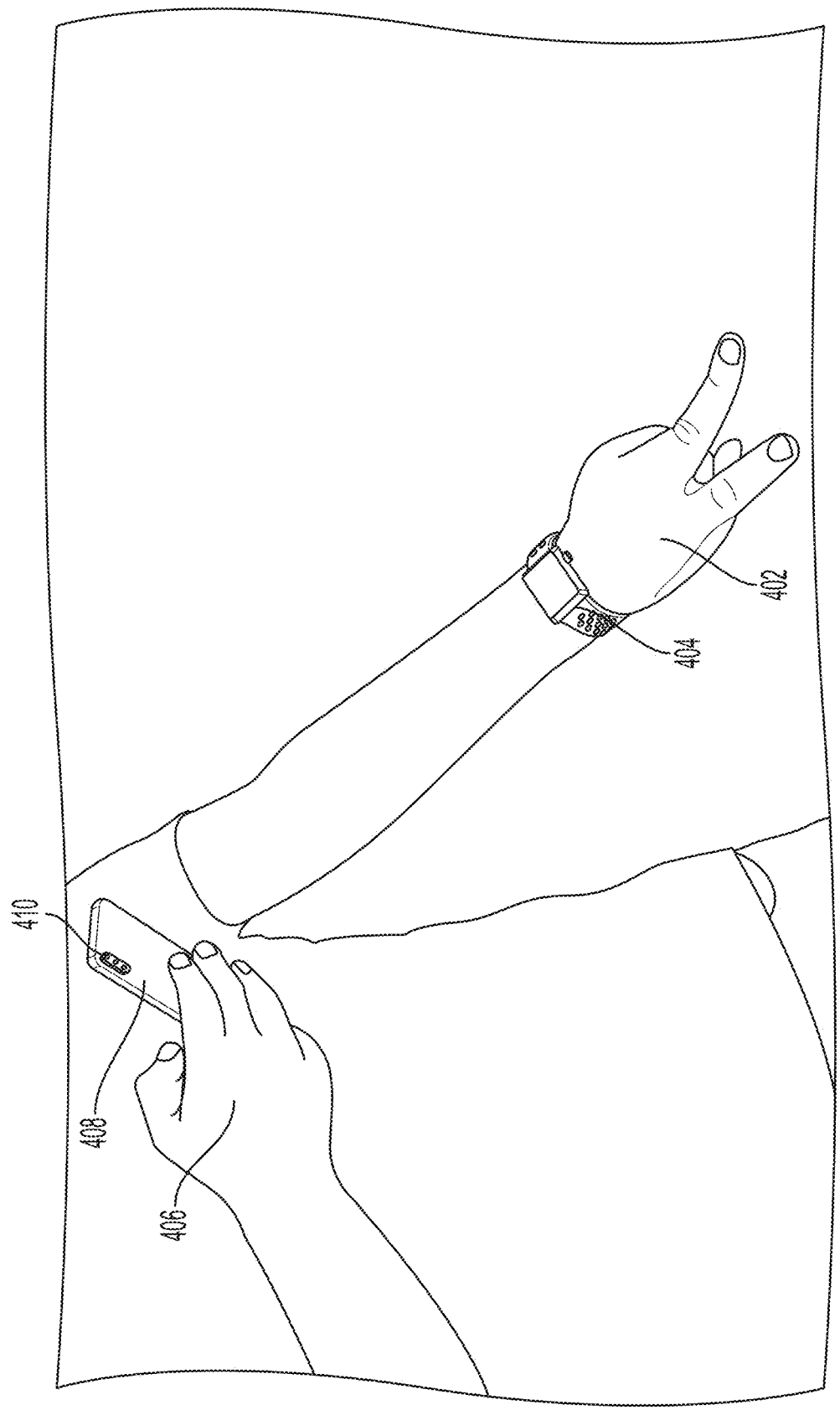
FIG. 4 shows an example of training a wearable device to perform gesture recognition, as discussed with reference to FIG. 3, in accordance with certain embodiments discussed herein

FIG. 4 shows an example of training a wearable device to perform gesture recognition, as discussed with reference to FIG. 3, in accordance with certain embodiments discussed herein. In particular, FIG. 4 shows a user performing an anatomical gesture with his/her left hand 402 on which a wearable device 404 resides. The wearable device 404 is configured to capture ultrasound data. The user further holds in his/her right hand 406 an image capture device 408 (in the example of FIG. 4, a smartphone) having a sensor 410 with which the user captures non-ultrasound data of the anatomical gesture performed with the left hand 402. As discussed above, the non-ultrasound data may be, for example, a two-dimensional or three-dimensional image or video of the anatomical gesture, where the image or video is captured using a different imaging modality than ultrasound imaging. The imaging modality may be, for example, standard optical imaging, radar imaging, or laser imaging. While the image capture device 408 shown in FIG. 4 is a smartphone, in some embodiments the image capture device may be another type of device such as a camera (i.e., a device whose primary purpose is capturing optical images) or a tablet device. The sensor 410 may include, for example, a standard camera sensor, a radar imaging sensor, a laser imaging sensor, and/or a structured illumination projector. For capturing three-dimensional images/videos, in some embodiments the sensor 410 may include a structured illumination projector and a standard camera (which may be the offset at least laterally from the structured illumination projector). In some embodiments, to collect three-dimensional images/videos of gestures being performed, the sensor 410 may include multiple standard cameras and the image capture device 408 use the multi-view stereo vision technique.

Figure 5:
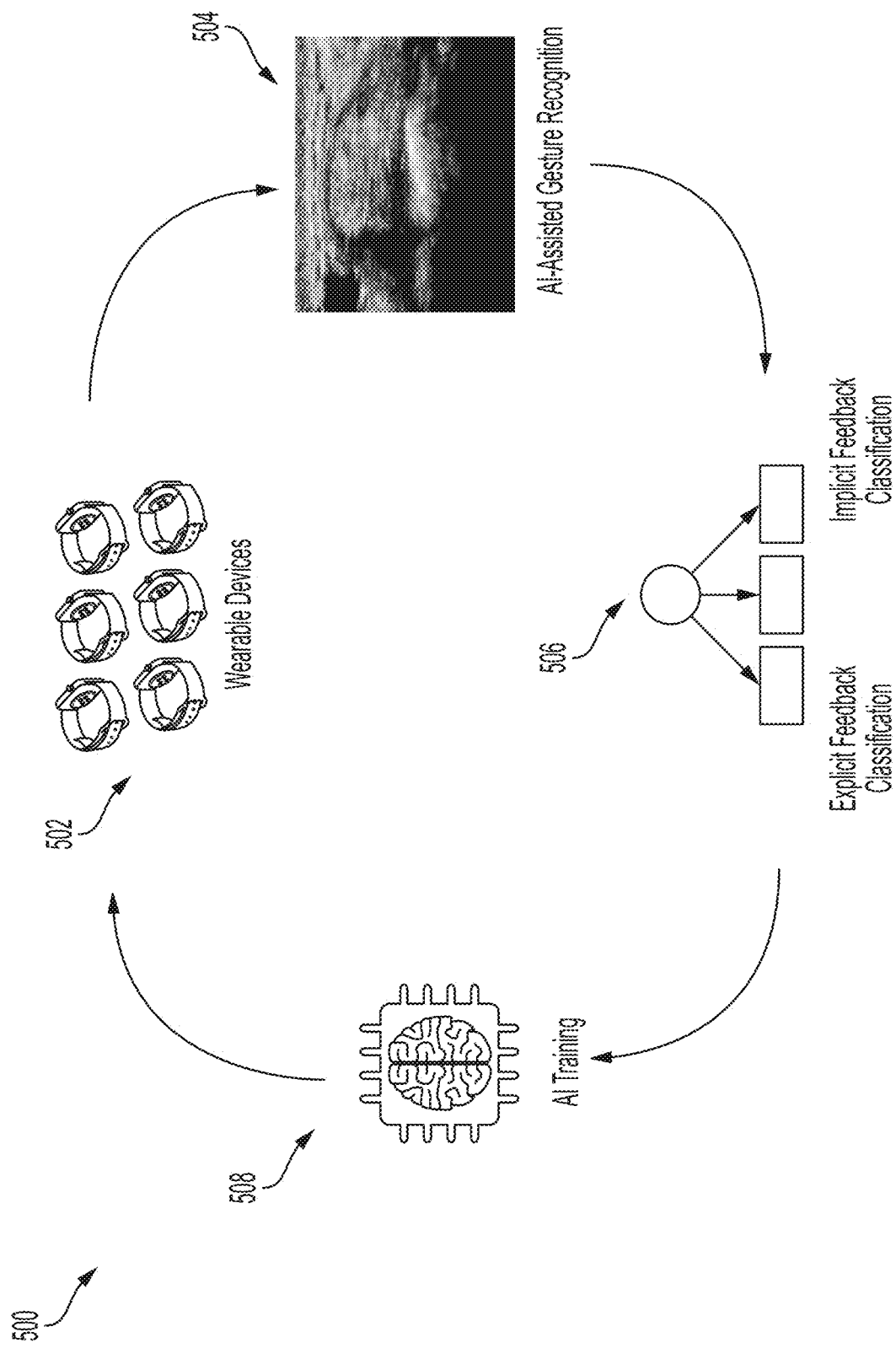
FIG. 5 shows an example of a "virtuous circle" for continuously improving the performance of certain processes and systems described herein.

FIG. 5 shows an example of a "virtuous circle" 500 for continuously improving the performance of certain processes and systems described herein. Stage 502 shows wearable devices (e.g., any of the wearable devices discussed herein). Each of the wearable devices may be associated with a different individual, group of individuals, institution, or group of institutions, and may be in different. Stage 504 shows that each of the wearable devices shown in stage 502 may be used to perform artificial intelligence (AI)-assisted gesture recognition, in which AI identifies a gesture being performed based on ultrasound data collected during performance of the gesture. Stage 506 shows that the data produced in stage 504 may be used as sources of feedback for AI models (as shown in stage 508). In particular, during explicit training of the AI models, a user may be prompted to perform a gesture by a display of a gesture classification, and ultrasound data collected during performance of the gesture may be correlated with the gesture classification in the prompt and used as a source of explicit feedback. Other sources of implicit feedback as to whether gestures have been correctly identified may be generated during normal use of wearable devices. For example, during normal use of a wearable device, if the user does not report an error following the device's identification of a gesture based on collected ultrasound data, the ultrasound data may be associated with the identified gesture, as it can be assumed that the gesture was correctly identified. If the user does report an error following the device's identification of a gesture (e.g., by selecting a "report error" option), or repeats the gesture very shortly after initially performing it, the ultrasound data may be associated with an indication that the original identification of the gesture was incorrect. Furthermore, during normal use of a wearable device, the wearable device may collect additional data (e.g., images collected using standard optical imaging, radar imaging, laser imaging, or over-the-air ultrasound imaging) of the anatomical gesture while simultaneously collecting standard ultrasound data. A learning-enabled network trained to identify gestures based on the additional data may be used to confirm whether a gesture has been correctly identified based on the collected ultrasound data. In stage 508, the ultrasound data and feedback from stages 504 and 506 may be uploaded to one or more servers (e.g., a "cloud" configuration), and may be used to train AI models (e.g., learning enabled networks or other machine learning models) hosted on the cloud to more accurately identify gestures based on ultrasound data. The trained models may be downloaded from the cloud to the wearable devices shown in stage 502 (e.g., across a wired or wireless communication link), and used to more accurately perform AI-assisted gesture recognition in stage 504. Accordingly, as more wearable devices are deployed and more data is collected and used to train models, the wearable devices and the AI-assisted gesture recognition may continue to improve as the wearable devices are updated by the most recent AI training.

Aspects of the technology described herein relate to the application of automated image processing techniques to analyze data and images, such as ultrasound data/images. In some embodiments, ultrasound data/images may be analyzed to identify a gesture being performed when the ultrasound data/images were captured. In some embodiments, the automated image processing techniques may include machine learning techniques such as deep learning techniques. Machine learning techniques may include techniques that seek to identify patterns in a set of data points and use the identified patterns to make predictions for new data points. These machine learning techniques may involve training (and/or building) a model using a training data set to make such predictions. The trained model may be used as, for example, a classifier that is configured to receive a data point as an input and provide an indication of a class to which the data point likely belongs as an output.

Deep learning techniques may include those machine learning techniques that employ learning enabled networks, and in particular neural networks, to make predictions. Neural networks typically include a collection of neural units (referred to as neurons) that each may be configured to receive one or more inputs and provide an output that is a function of the input. For example, the neuron may sum the inputs and apply a transfer function (sometimes referred to as an "activation function") to the summed inputs to generate the output. The neuron may apply a weight to each input to, for example, weight some inputs higher than others. Example transfer functions that may be employed include step functions, piecewise linear functions, and sigmoid functions. These neurons may be organized into a plurality of sequential layers that each include one or more neurons. The plurality of sequential layers may include an input layer that receives the input data for the neural network, an output layer that provides the output data for the neural network, and one or more hidden layers connected between the input and output layers. Each neuron in a hidden layer may receive inputs from one or more neurons in a previous layer (such as the input layer) and provide an output to one or more neurons in a subsequent layer (such as an output layer).

A neural network may be trained using, for example, labeled training data. The labeled training data may include a set of example inputs and an answer associated with each input. For example, the training data may include a plurality of sets of ultrasound data that are each labeled with a gesture that was performed when the ultrasound data was captured. In this example, the ultrasound data may be provided to the neural network to obtain outputs that may be compared with the labels associated with each of the ultrasound images. One or more characteristics of the neural network (such as the interconnections between neurons (referred to as edges) in different layers and/or the weights associated with the edges) may be adjusted until the neural network correctly classifies most (or all) of the input images.

Once the training data has been created, the training data may be loaded to a database and used to train a neural network using deep learning techniques. Once the neural network has been trained, the trained neural network may be deployed to one or more host devices. It should be appreciated that the neural network may be trained with any number of sample data sets. For example, a neural network may be trained with as few as 7 or so sample data sets, although it will be appreciated that the more sample images used, the more robust the trained model data may be.

Figure 6:
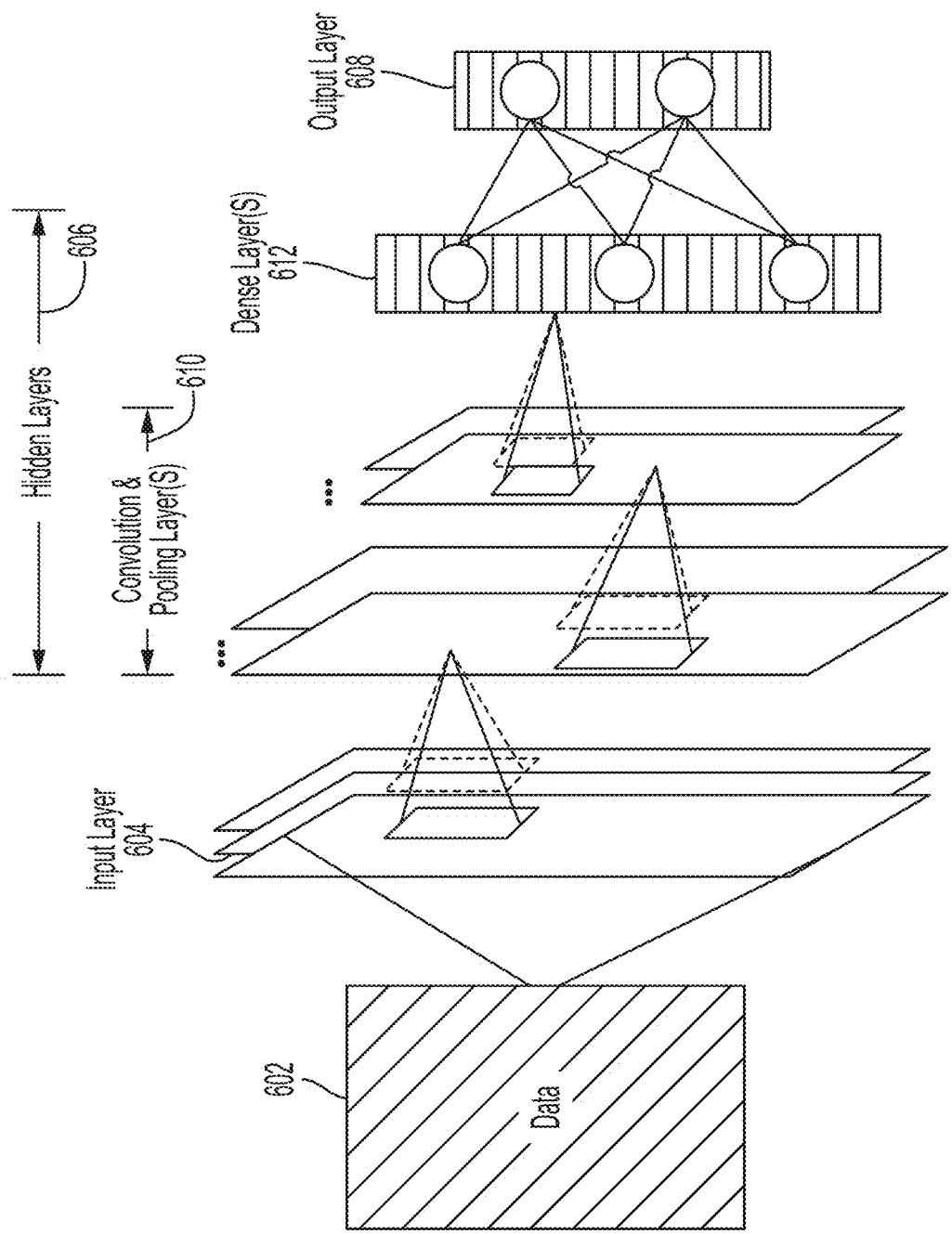
FIG. 6 shows an example convolutional neural network that is configured to analyze data in accordance with certain embodiments disclosed herein.

In some applications, a neural network may be implemented using one or more convolution layers to form a convolutional neural network. FIG. 6 shows an example convolutional neural network that is configured to analyze data 602 (which may be ultrasound data/an ultrasound image) in accordance with certain embodiments disclosed herein. As shown, the convolutional neural network includes an input layer 604 to receive the data 602, an output layer 608 to provide the output, and a plurality of hidden layers 606 connected between the input layer 604 and the output layer 608. The plurality of hidden layers 606 includes convolution and pooling layers 610 and dense layers 612. The input layer 604 may receive the input to the convolutional neural network. As shown in FIG. 6, the input the convolutional neural network may be the data 602.

The input layer 604 may be followed by one or more convolution and pooling layers 610. A convolutional layer may include a set of filters that are spatially smaller (e.g., have a smaller width and/or height) than the input to the convolutional layer (e.g., the data 602). Each of the filters may be convolved with the input to the convolutional layer to produce an activation map (e.g., a 2-dimensional activation map) indicative of the responses of that filter at every spatial position. The convolutional layer may be followed by a pooling layer that down-samples the output of a convolutional layer to reduce its dimensions. The pooling layer may use any of a variety of pooling techniques such as max pooling and/or global average pooling. In some embodiments, the down-sampling may be performed by the convolution layer itself (e.g., without a pooling layer) using striding.

The convolution and pooling layers 610 may be followed by dense layers 612. The dense layers 612 may include one or more layers each with one or more neurons that receives an input from a previous layer (e.g., a convolutional or pooling layer) and provides an output to a subsequent layer (e.g., the output layer 608). The dense layers 612 may be described as "dense" because each of the neurons in a given layer may receive an input from each neuron in a previous layer and provide an output to each neuron in a subsequent layer. The dense layers 612 may be followed by an output layer 608 that provides the output of the convolutional neural network. The output may be, for example, an indication of which class, from a set of classes, the data 602 (or any portion of the data 602) belongs to.

It should be appreciated that the convolutional neural network shown in FIG. 6 is only one example implementation and that other implementations may be employed. For example, one or more layers may be added to or removed from the convolutional neural network shown in FIG. 6. Additional example layers that may be added to the convolutional neural network include: a rectified linear units (ReLU) layer, a pad layer, a concatenate layer, and an upscale layer. An upscale layer may be configured to upsample the input to the layer. An ReLU layer may be configured to apply a rectifier (sometimes referred to as a ramp function) as a transfer function to the input. A pad layer may be configured to change the size of the input to the layer by padding one or more dimensions of the input. A concatenate layer may be configured to combine multiple inputs (e.g., combine inputs from multiple layers) into a single output.

Convolutional neural networks may be employed to perform any of a variety of functions described herein. For example, a convolutional neural network may be employed to identify a gesture being performed based on ultrasound data collected when the gesture was performed. It should be appreciated that more than a single convolutional neural network may be employed to perform a function. Further discussion of deep learning techniques can be found in U.S. patent application Ser. No. 15/626,423 titled "AUTOMATIC IMAGE ACQUISITION FOR ASSISTING A USER TO OPERATE AN ULTRASOUND DEVICE," filed on Jun. 19, 2017 (and assigned to the assignee of the instant application), which is incorporated by reference herein in its entirety. It should further be appreciated that other machine learning models, such as the use of random forests, support vector machines, and linear classifiers may also be used to perform any of the functions described herein.

Figure 7:
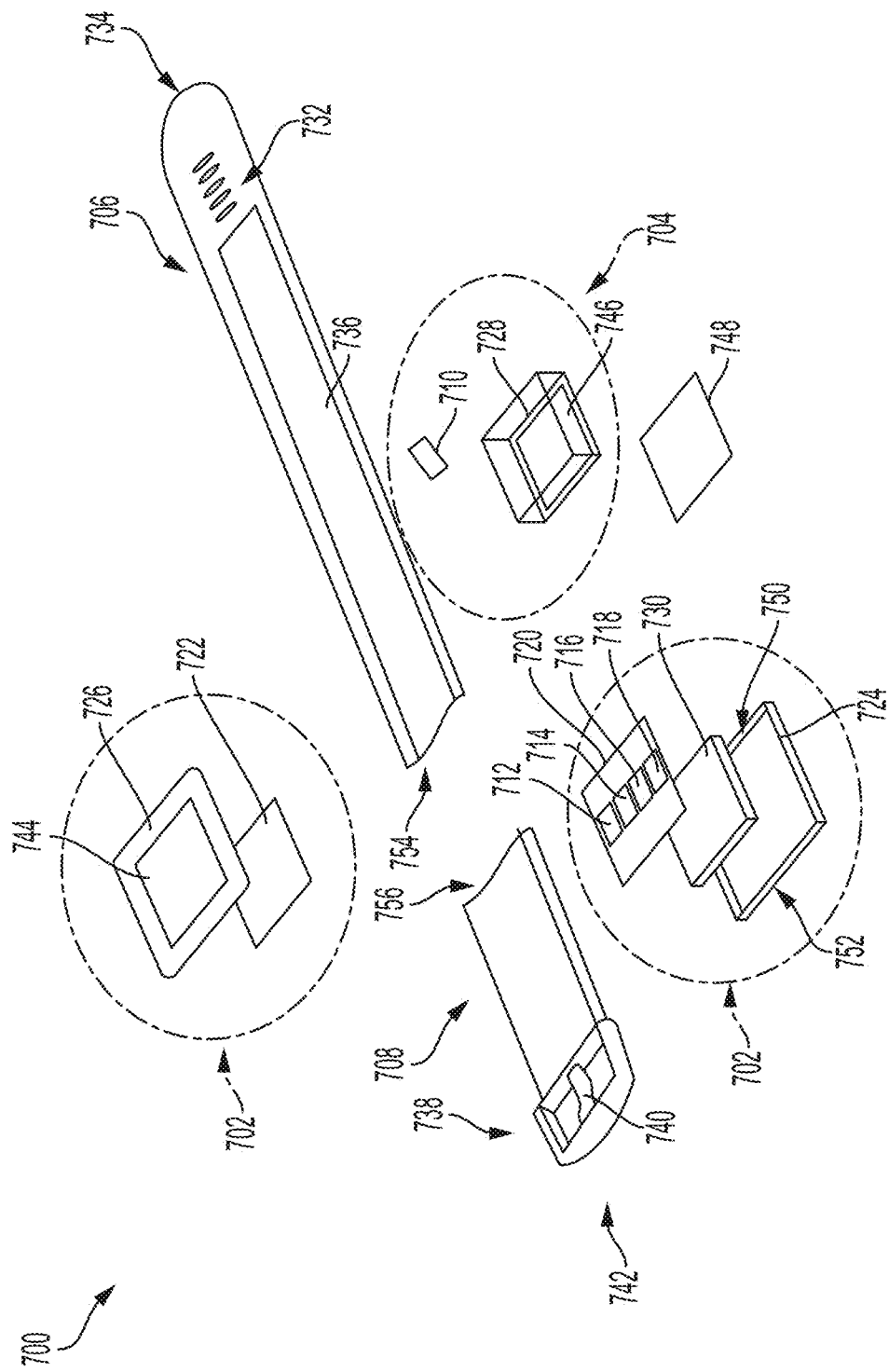
FIG. 7 shows an example of a wearable device for ultrasound data collection configured to be worn on a user's wrist, in accordance with certain embodiments disclosed herein.

FIG. 7 shows an example of a wearable device 700 for ultrasound data collection configured to be worn on a user's wrist, in accordance with certain embodiments disclosed herein. In FIG. 7, the wearable device 700 is shown disassembled. The wearable device 700 is wearable by a user around the user's wrist and includes a primary module 702, an ultrasound module 704, a coupling element 748, a first wristband 706, and a second wristband 708. It should be understood that as referred to herein, a "wristband" may be any type of band configured to encircle any portion of the wrist, or the entire wrist.

The ultrasound module 704 includes an ultrasound-on-a-chip device 710 and an ultrasound housing element 728. The primary module 702 includes a printed circuit board (PCB) 720, a display screen 722, a battery 730, and primary housing elements 724 and 726. On the PCB 720 is processing circuitry 712, memory circuitry 714, communication circuitry 716, and power management circuitry 718. The first wristband 706 includes a plurality of holes 732 at its first end portion 734 that are each located at a different distance from the first end portion 734 of the first wristband 706. Conductors 736 extend through the first wristband 706 and extend into the primary housing elements 724 and 726 to electrically connect the ultrasound module 704 to the PCB 720. The second wristband 708 includes a buckle 738 at its first end portion 742. The buckle 738 includes a pin 740.

The ultrasound-on-a-chip device 710 includes micromachined ultrasound transducers integrated with a semiconductor die containing integrated ultrasound circuitry. In some embodiments, the ultrasonic transducers may be formed on the same chip as the ultrasound circuitry to form a monolithic ultrasound device. In other embodiments, certain portions of the ultrasound circuitry may be in a different semiconductor chip than the transducers. The ultrasound transducers may be capacitive micromachined ultrasonic transducers (CMUTs). The CMUTs may be integrated with CMOS (complementary metal oxide semiconductor) circuitry. A CMUT may, for example, include a cavity formed in a CMOS wafer, with a membrane overlying the cavity, and in some embodiments sealing the cavity. Electrodes may be provided to create a transducer cell from the covered cavity structure. The CMOS wafer may include integrated circuitry to which the transducer cell may be connected. The transducer cell and CMOS wafer may be monolithically integrated, thus forming an integrated ultrasonic transducer cell and integrated circuit on a single substrate (the CMOS wafer). CMUTs integrated with CMOS circuitry may be referred to as CMOS ultrasonic transducers (CUTs).

The ultrasound transducers may be arranged in a one-dimensional array or a two-dimensional array, and there may be 1024, 2048, 4096, 8192, 16384, or any other suitable number of transducer elements in the array. The transducers may be arranged with a 50 μm, 100 μm, 130 μm, 200 μm, 250 μm, or any other suitable pitch. The semiconductor die/dice may be 5 mm×5 mm, 10×5 mm, 1×1 cm, 1.5×1 cm, 1.5 cm×1.5 cm, 2×1 cm, 2×1.5 cm, 2×2 cm, or any other suitable size. In some embodiments, the ultrasound-on-a-chip device 710 includes a transducer array having 2048 transducer elements arranged in a 64×32 array with a 130 μm pitch on a semiconductor die that is 10×5 mm in size. In some embodiments, the ultrasound-on-a-chip device 710 includes a transducer array having 4096 transducer elements arranged in a 64×64 array with a 130 μm pitch on a semiconductor die that is 1×1 cm in size. The ultrasound circuitry in the ultrasound-on-a-chip device 710 may include transmit circuitry that transmits a signal to a transmit beamformer in the ultrasound-on-a-chip device 710 which in turn drives the ultrasound transducers to emit pulsed ultrasonic signals into the user's wrist. The pulsed ultrasonic signals may be back-scattered from structures in the user's wrist, such as blood vessels, to produce echoes that return to the transducers. These echoes may then be converted into electrical signals, or ultrasound data, by the transducer elements, and the electrical signals are received by receive circuitry in the ultrasound circuitry. The electrical signals representing the received echoes are sent to a receive beamformer in the ultrasound-on-a-chip device 710 that outputs ultrasound data in response to the received echoes. For further description of examples of ultrasound devices and ultrasound circuitry, see U.S. patent application Ser. No. 15/415,434 titled "UNIVERSAL ULTRASOUND DEVICE AND RELATED APPARATUS AND METHODS."

In some embodiments, the ultrasound transducers in the ultrasound-on-a-chip device 710 may emit ultrasound waves having frequencies between approximately 5-20 MHz in order to collect ultrasound data from the wrist. In some embodiments, the ultrasound-on-a-chip device 710 may emit ultrasound waves having frequencies up to approximately 21 MHz, 22 MHz, 23 MHz, 24 MHz, 25 MHz, 26 MHz, 27 MHz, 28 MHz, 29 MHz, 30 MHz, >30 MHz, or any suitable frequency. In some embodiments, the ultrasound-on-a-chip device 710 may emit ultrasound waves having frequencies down to approximately 4 MHz, 3 MHz, 2 MHz, 1 MHz, <1 MHz, or any suitable frequency.

The ultrasound-on-a-chip device 710 is positioned in the ultrasound module 704 such that its longitudinal axis is parallel to the longitudinal axis of the first wristband 706. In some embodiments, it may be possible to rotate the ultrasound module 704 to a desired orientation relative to the first wristband 706 prior to coupling the ultrasound module 704 to the first wristband 706.

The ultrasound-on-a-chip device 710 may transmit collected ultrasound data over the conductors 736 to the processing circuitry 712. The ultrasound module 704 and the PCB 720 are electrically coupled to the conductors 736 which extend through the first wristband 706 and into the primary module 702. The conductors 736 may be, for example, in a flexible printed circuit board or a cable.

The ultrasound housing element 728 and the first wristband 706 enclose the ultrasound-on-a-chip device 710. The ultrasound housing element 728 has an acoustic lens 746 through which ultrasonic waves can propagate from the ultrasound-on-a-chip device 710 into the user's wrist. In some embodiments, the acoustic lens 746 is a simple opening in the ultrasound housing element 728. When the wearable device 700 is assembled, the ultrasound housing element 728 faces the user's wrist. In some embodiments, the ultrasound housing element 728 is a protrusion from the first wristband 706 that forms a cavity that contains the ultrasound-on-a-chip device 710.

The coupling element 748 is attached to the surface of the acoustic lens 746 that faces the user's wrist. The coupling element 748 is configured to reduce the air gap between the ultrasound module 704 and the user's wrist and to establish acceptable impedance matching coupling for ultrasound signal transmission and reception. In some embodiments, therefore, the coupling element 748 may be considered an impedance matching strip, or an impedance matching coupler. Further examples of the coupling element 748 are described in more detail hereinafter with reference to FIG. 15.

In the primary module 702, the PCB 720 is communicatively coupled to the display screen 722, for example by internal wires within the primary housing elements 724 and 726, and includes processing circuitry 712, memory circuitry 714, communication circuitry 716, and power management circuitry 718, which may be included in one or more semiconductor chips on the PCB 720. The processing circuitry 712 may be configured to perform any of the functionality described herein (e.g., processes 100, 200, and 300). The processing circuitry 712 may include one or more processors (e.g., computer hardware processors) and may be configured to execute one or more processor-executable instructions stored in the memory circuitry 714. The memory circuitry 714 may be used for storing programs and data and may include one or more storage devices such as non-transitory computer-readable storage media. The processing circuitry 712 may control writing data to and reading data from the memory circuitry 714 in any suitable manner. The processing circuitry 712 is configured to receive ultrasound data from the ultrasound-on-a-chip device 710 and includes image reconstructions circuitry for reconstructing the ultrasound data into an ultrasound image (which may be two-dimensional images or, when the ultrasound-on-a-chip device 710 includes a two-dimensional array, three-dimensional images). The processing circuitry 712 may also be configured to perform calculations (e.g., anatomical or physiological measurements) based on ultrasound data and/or ultrasound images (which may be two-dimensional images or, when the ultrasound-on-a-chip device 710 includes a two-dimensional array, three-dimensional images). The processing circuitry 712 may include specially-programmed and/or special-purpose hardware such as an application-specific integrated circuit (ASIC). For example, the processing circuitry 712 may include one or more ASICs specifically designed for machine learning (e.g., deep learning). The ASICs specifically designed for machine learning may be employed to, for example, accelerate the inference phase of a neural network. The processing circuitry 712 also includes control circuitry that is configured to supply control signals that are transmitted over the conductors 736 to control operation of the ultrasound-on-a-chip device 710, such as operation of the transmit and receive circuitry. The control circuitry is also configured to supply control signals to the display screen 722, the circuitry on the PCB 720, and the ultrasound-on-a-chip device 710 to control their operation. The processing circuitry 712 may include a field-programmable gate array (FPGA).

The battery 730 is electrically connected to the PCB 720 and the display screen 722 to provide power to the circuitry on the PCB 720 and the display screen 722. The battery 730 is also configured to supply power to the ultrasound-on-a-chip device 710 over the conductors 736. The battery 730 may be any type of battery, such as a button cell battery (e.g., a zinc air cell battery, type PR48, size A13), a lithium ion battery, or a lithium polymer battery. The battery 730 may be rechargeable. The power management circuitry 718 is configured to manage supply of power from the battery 730 to the PCB 720, the display screen 722, and to the ultrasound-on-a-chip device 710. The power management circuitry 718 may be responsible for converting one or more input voltages from the battery 730 into voltages needed to carry out operation of the ultrasound-on-a-chip device 710, and for otherwise managing power consumption within the device ultrasound-on-a-chip device 710. For example, the power management circuitry 718 may step the input voltage up or down, as necessary, using a charge pump circuit or via some other DC-to-DC voltage conversion mechanism.

The communication circuitry 716 is configured to wirelessly transmit data (e.g., ultrasound data, ultrasound images, calculations based on ultrasound data/images) to an external device, such as external host device, workstation, or server. The communication circuitry 716 may include BLUETOOTH, ZIGBEE, and/or WiFi wireless communication circuitry. In some embodiments, the communication circuitry 716 may be configured to transmit data to the external device over a wired connection, such as a SERDES, DDR, USB, OR MIPI wired connection.

The primary module 702 may be configured as any type of electronic device and may perform functions unrelated to ultrasound data collection. For example, the primary module 702 may be configured as a smart wristwatch or a smart wristband, and the display screen 722 may be configured to display any type of data, including the time, e-mail, instant messages, and/or internet. The display screen 722 may be any type of display screen, such as a low-power light emitting diode (LED) array, a liquid-crystal display (LCD) array, an active-matrix organic light-emitting diode (AMO-LED) display, or a quantum dot display. The display screen 722 may be curved. The primary module 702 may include other sensors, such as global positioning, gyroscope, magnetometer, accelerometer, barometer, blood alcohol level, glucose level, blood oxygenation level, microphone, heart rate, ultraviolet, electromyography (EMG), and galvanic skin response sensors, and the display screen 722 may display data from these additional sensors. Certain sensors may be internal to the primary module 702 while others may be integrated on external surfaces of the primary housing elements 724 and 726. In some embodiments, the display screen 722 may be absent.

In some embodiments, the ultrasound module 704 is configured to communicate with the primary module 702 wirelessly. In such embodiments, the ultrasound module 704 may include wireless communication circuitry configured to communicate wirelessly with the communication circuitry 716 of the primary module 702. The ultrasound module 704 and the primary module 702 may wirelessly communicate ultrasound data from the ultrasound module 704 to the primary module 702 and control signals from the primary module 702 to the ultrasound module 704. In some embodiments, the ultrasound module 704 includes a battery and does not draw power from the battery 730 in the primary module 702. In embodiments where the ultrasound module 704 communicates wirelessly with the primary module 702 and has its own battery, the conductors 736 may be absent. In some embodiments the ultrasound module 704 may charge or power itself inductively from the primary module 702 or an auxiliary charger.

In some embodiments, the ultrasound module 704 may include internal processing circuitry 712, memory circuitry 714, communication circuitry 716, and/or power management circuitry 718. Portions of the circuitry may be integrated with the ultrasound-on-a-chip device 710. In such embodiments, the ultrasound module 704 may perform image reconstruction and/or data transmission to an external device using circuitry internal to the ultrasound module 704, and may not communicate with the primary module 702. Accordingly, the conductors 736 may be absent.

The primary housing elements 724 and 726 enclose the PCB 720, the display screen 722, and the battery 730. The display screen 722 is positioned adjacent to the primary housing element 724, which includes an opening 744 through which the display screen 722 can be seen. When the wearable device 700 is assembled, the primary housing element 724 faces the user's wrist and the primary housing element 726 faces away from the user's wrist. The primary housing element 726 and the display screen 722 are positioned on an opposite surface of the wearable device 700 (i.e., the surface that faces away from the user's wrist) than the PCB 720, the battery 730, and the primary housing element 724. In some embodiments, the primary housing elements 724 and 726 may be a single element. For example, the single primary housing element may have a hinge so that the ultrasound housing element can open the PCB 720, the display screen 722, and the battery 730 can be inserted inside. As another example, the single primary housing element may have a slot into which the PCB 720, the display screen 722, and the battery 730 can be inserted.

The first wristband 706 is coupled at its second end portion 754 to a first end portion 750 of the primary housing element 724. The second wristband 708 is coupled at its second end portion 756 to a second end portion 752 of the primary housing element 724. The first and second wristbands 706 and 708 may be configured to couple to the primary housing element 724 through any coupling means, such as a clip, a snap, a screw, an adhesive, magnetism, Velcro, an interlocking fit, etc. In some embodiments, the primary housing element 724 may include pairs of lugs at each of its first and second end portions 734 and 736, with spring bars bridging each pair of lugs, and the first and second wristbands 706 and 708 may loop around the spring bars. The first and second wristbands 706 and 708 may be made of any material, such as leather, fabric, plastic, and metal. The first and second wristbands 706 and 708 may have any shape and may resemble a conventional band for a wristwatch or a bracelet.

The wearable device 700 can be bound to the user's wrist by inserting the pin 740 into one of the plurality of holes 732. Based on which hole of the plurality of holes 732 is used, the circumference of the wearable device 700 can be adjusted so that the wearable device 700 fits around the user's wrist. In some embodiments, the wearable device 700 may be bound to the user's wrist using other mechanisms. For example, instead of the plurality of holes 732 and the buckle 738, the first and second wristbands 706 and 708 may include a clip, a snap, Velcro, magnets, or an interlocking fit. In some embodiments, the wearable device 700 includes just one wristband, or more than two wristbands.

The ultrasound module 704 is configured to attach to the first wristband 706. In some embodiments, the ultrasound module 704 is attached to the first wristband 706 at a position not intended to be moved. For example, the ultrasound module 704 may be positioned at a specific location on the first wristband 706 such that, when the wearable device 700 is worn, the ultrasound module 704 is positioned over a specific region of the user's wrist (e.g., a region where gestures can be identified based on ultrasound data). The ultrasound module 704 may be configured to attach to the first wristband 706 through any coupling means. For example, the ultrasound module 704 may attach to the first wristband 706 through complementary Velcro, magnets, or snaps on the ultrasound module and the first wristband 706. In some embodiments, the wearable device 700 is configured such that the position of the ultrasound module 704 on the first wristband 706 can be changed. In some embodiments, the first wristband 706 may include a plurality of discrete coupling points along its length (e.g., discrete magnets, discrete Velcro elements, discrete snap locations). In other embodiments, the first wristband 706 has a continuous coupling region along its length (e.g., a continuous length of magnetic material or a continuous length of Velcro material). In some embodiments, the ultrasound module 704 may include a clip for clipping the ultrasound module 704 to the first wristband 706. In other embodiments, the first wristband 706 may have a cavity into which the ultrasound-on-a-chip device 710 is placed. In yet other embodiments, the first wristband 706 includes a plurality of holes and the ultrasound module 704 includes a pin, and the ultrasound module 704 may be coupled to the first wristband 706 by inserting the pin into one of the plurality of holes.

In some embodiments, the primary module 702 may be absent, and the PCB 720, the processing circuitry 712, the memory circuitry 714, the communication circuitry 716, the power management circuitry 718, and the battery 730 may be included in the ultrasound module 704. In such embodiments, the first wristband 706 and the second wristband 708 may be a single continuous wristband.

Figure 8:
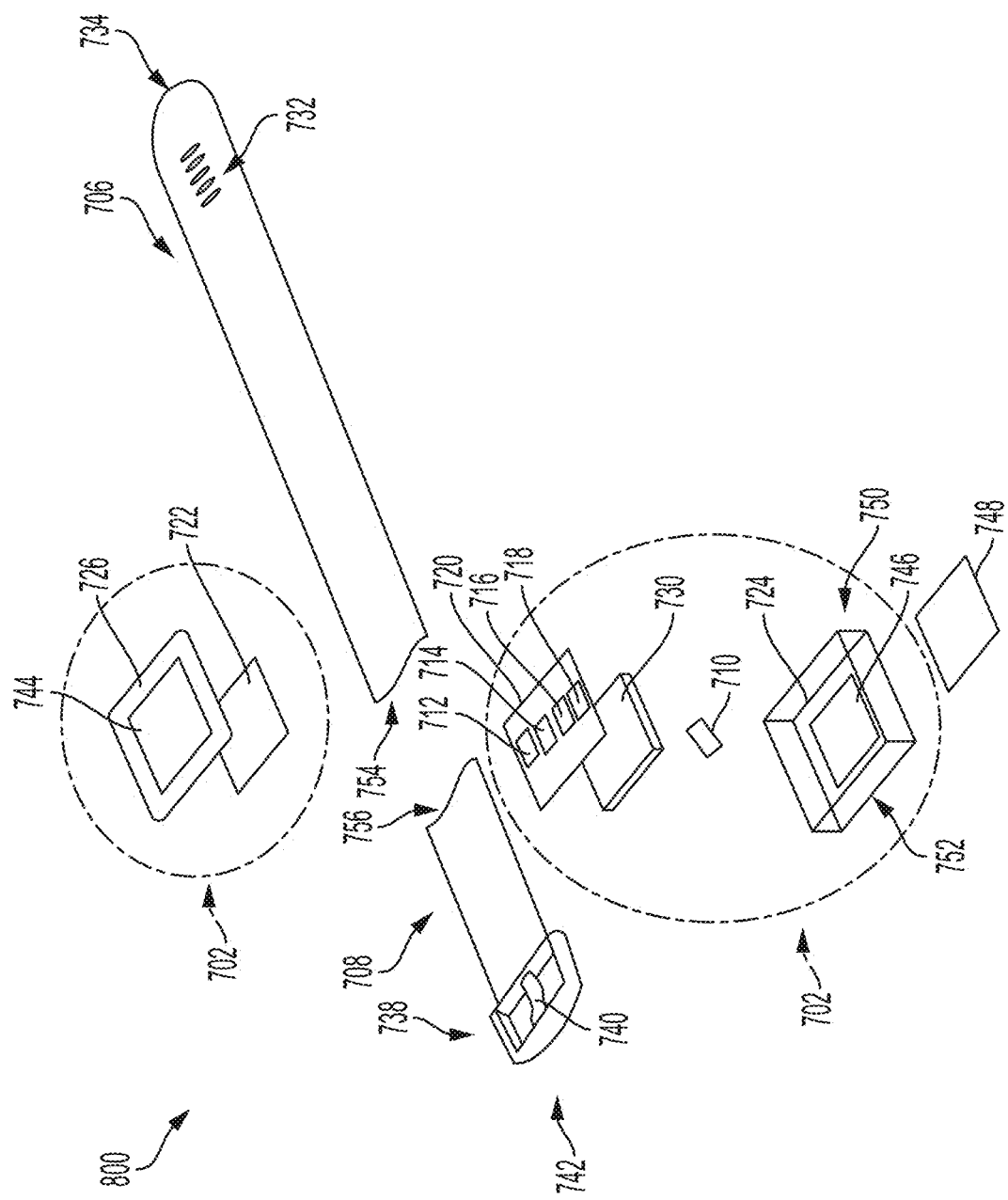
FIG. 8 shows another example of a wearable device for ultrasound data collection configured to be worn on a user's wrist, in accordance with certain embodiments disclosed herein.

FIG. 8 shows another example of a wearable device 800 for ultrasound data collection configured to be worn on a user's wrist, in accordance with certain embodiments disclosed herein. The wearable device 800 is wearable by a user around the user's wrist. In FIG. 8, the wearable device 800 is shown disassembled. The following description discusses differences between the wearable device 800 and the wearable device 700.

The wearable device 800 lacks the ultrasound module 704. The ultrasound-on-a-chip device 710 is located in the primary module 702. The primary housing element 724 includes the acoustic lens 746, and the first wristband 706 lacks internal conductors to interface with an ultrasound module. The coupling element 748 is coupled to the surface of the primary housing element 724 that faces the user's wrist. The ultrasound-on-a-chip device 710 and may be able to collect ultrasound data from various muscles depending on how the primary module 702 is worn (e.g., whether the primary module 702 is worn on the dorsal or volar wrist).

Figure 9:
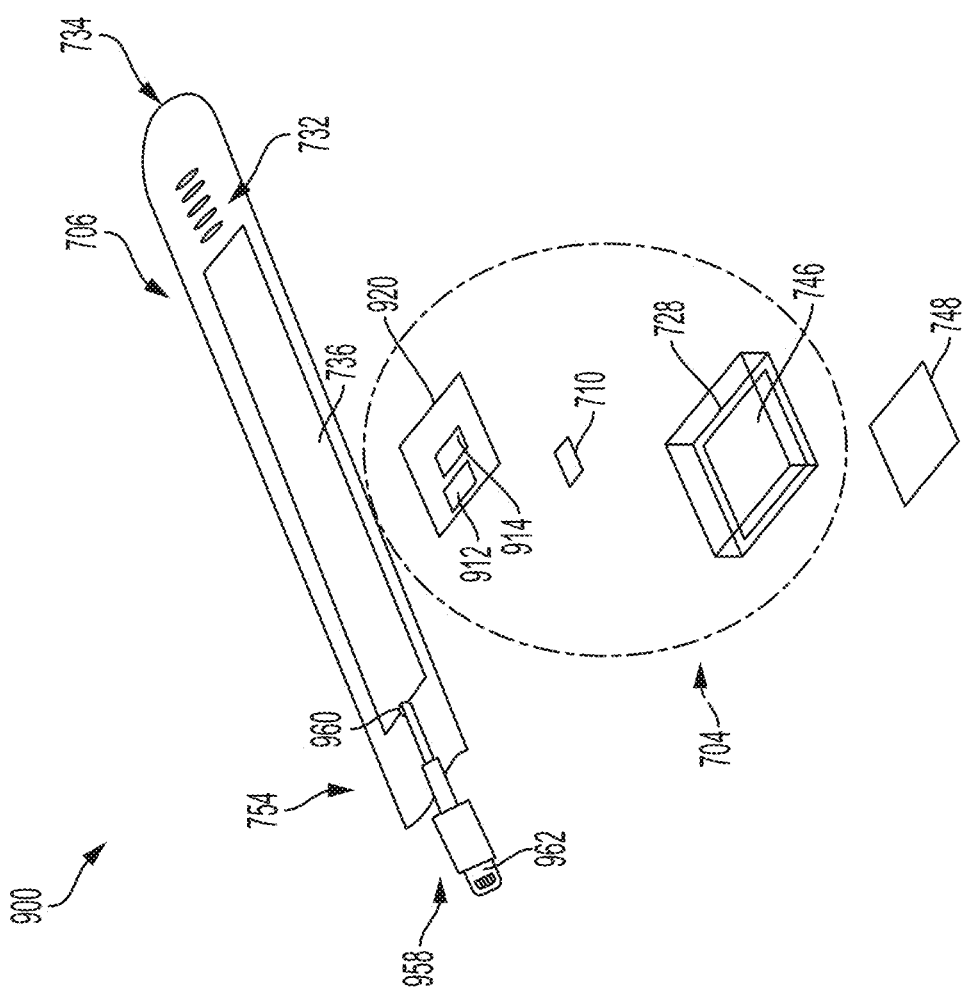
FIG. 9 shows another example of a wearable device for ultrasound data collection configured to be worn on a user's wrist, in accordance with certain embodiments disclosed herein.

FIG. 9 shows another example of a wearable device 900 for ultrasound data collection configured to be worn on a user's wrist, in accordance with certain embodiments disclosed herein. The wearable device 900 is configured as a wristband that the user can physically couple to a wristband of his or her personal smartwatch module and electrically connect to the smartwatch module. In some embodiments, the wearable device 900 may be configured as an interchangeable wristband that the user can couple (physically and electrically) to his or her personal smartwatch module directly, replacing the smartwatch's original wristband. In FIG. 9, the wearable device 900 is shown disassembled. The following description discusses differences between the wearable device 900 and the wearable device 700.

The wearable device 900 lacks the primary module 702. The ultrasound module 704 includes a printed circuit board (PCB) 920. On the PCB 920 is the processing circuitry 712 and the memory circuitry 714. In contrast to wearable device 800, the ultrasound module 904 has internal processing circuitry 912 and memory circuitry 914, because the smartwatch to which the wearable device 900 is intended to be coupled may not have processing and memory circuitry capable of interfacing with the ultrasound-on-a-chip device 710 and processing ultrasound data.

The first wristband 706 includes conductors 736 extending through the first wristband 706 that connect to a connection cable 958 at the second end portion 754 of the first wristband 706. The connection cable 958 exits from the first wristband 706 through an opening 960 in the first wristband 706 and has a male connector 962 configured to connect to a complementary female port on the user's personal smartwatch. Examples of plugging the male connector 962 into the smartwatch will be illustrated further in FIG. 12. In some embodiments, the wearable device 900 may include a plate configured to screw into the user's personal smartwatch at the complementary female port and to prevent the male connector 962 from being removed from the female port on the smartwatch during use of the wearable device 900.

The conductors 736 and the connection cable 958 electrically connect the ultrasound module 704 to the user's smartwatch. Accordingly, the ultrasound module 704 may use components within the user's smartwatch, and the ultrasound module 704 does not itself need to include these components. For example, in FIG. 9, the ultrasound module 704 is configured to draw power from the smartwatch's battery to power the ultrasound-on-a-chip device 710 and circuitry on the PCB 920. Additionally, the ultrasound module 704 is configured to transmit through the conductors 736 and the connection cable 958 data (e.g., ultrasound data, ultrasound images, calculations based on ultrasound images) to communication circuitry within the smartwatch for wireless transmission to an external device, such as external host device, workstation, or server. The user's personal smartwatch may run an application ("app") configured to interface with the ultrasound module 704. The connection cable 958 may be any type of connection cable, such as a lightning connector or a mini-USB connector.

The wearable device 900 may be configured to couple along its longitudinal axis to the longitudinal axis of the smartwatch's wristband. The wearable device 900 may couple to the wristband of the user's personal smartwatch using any coupling means. For example, the first wristband 706 may include pins configured to be inserted into holes in the wristband of the user's smartwatch. As other examples, the wearable device 900 may couple to the wristband of the user's smartwatch with screws, Velcro, adhesive, a snap, a slot and groove, one or more magnets. In embodiments where the wearable device 900 couples directly to the smartwatch module, replacing the smartwatch's wristband, the wearable device 900 may be configured to couple to the smartwatch module through any coupling means, such as a clip, a snap, a screw, an adhesive, magnetism, Velcro, an interlocking fit, etc.

In some embodiments, the ultrasound module 704 has an internal battery and is not configured to draw on the battery in the user's smartwatch. In some embodiments, the ultrasound module 704 has communication circuitry internal to the ultrasound module 704 and is not configured to use communication circuitry in the user's smartwatch. In some embodiments, the ultrasound module 704 may transmit ultrasound data collected by the ultrasound-on-a-chip device 710 to processing circuitry in the user's smartwatch that is configured to reconstruct the ultrasound data into ultrasound images (which may be two-dimensional images or, when the ultrasound-on-a-chip device 710 includes a two-dimensional array, three-dimensional images), and may receive control signals from control circuitry in the user's smartwatch. For example, an application on the user's smartwatch may include instructions for the processing circuitry to reconstruct ultrasound data into ultrasound images and instructions for the control circuitry to output control signals for the ultrasound-on-a-chip device 710. In such embodiments, the ultrasound module 704 may lack the processing circuitry 712 and/or the memory circuitry 714.

Figure 10:
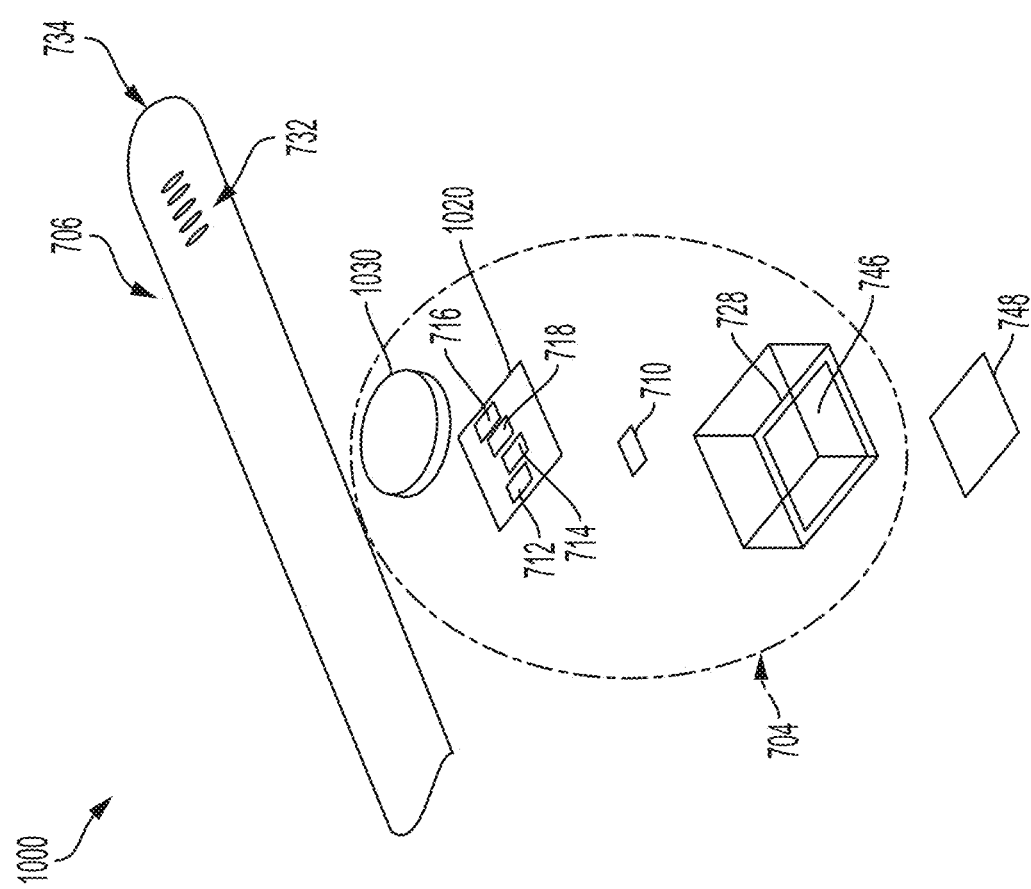
FIG. 10 shows another example of a wearable device for ultrasound data collection configured to be worn on a user's wrist, in accordance with certain embodiments disclosed herein.

FIG. 10 shows another example of a wearable device 1000 for ultrasound data collection configured to be worn on a user's wrist, in accordance with certain embodiments disclosed herein. The wearable device 1000 is configured as a wristband that the user can physically couple to a wristband of his or her personal wrist device, which may be a standard analog watch module, a standard digital watch module, or a smartwatch. In some embodiments, the wearable device 1000 may be configured as an interchangeable wristband that the user can couple (physically and electrically) to his or her personal wrist device, replacing the wrist device's original wristband. In FIG. 10, the wearable device 1000 is shown disassembled. The following description discusses differences between the wearable device 1000 and the wearable device 900.

The ultrasound module 704 includes a printed circuit board (PCB) 1020 and a battery 1030. On the PCB 1020 is the processing circuitry 712, the memory circuitry 714, the communication circuitry 716, and the power management circuitry 718. Accordingly, in contrast to the wearable device 900, the ultrasound module 704 does not need to use components (e.g., communication circuitry, battery) outside of the ultrasound module 704 (e.g., in the user's personal smartwatch to which the wearable device 1000 is coupled) because these components are already include internally in the ultrasound module 704. Therefore, the first wristband 706 lacks communication means (e.g., conductors internal to the first wristband 706 and a connection cable extending from the first wristband 706) to interface with the user's personal wristwatch. The battery 1030 may be any type of battery, such as a button cell battery (e.g., a zinc air cell battery, type PR48, size A13), a lithium ion battery, or a lithium polymer battery. The battery 1030 may be rechargeable. Examples of coupling the wearable device 1000 to the wristband of the user's wrist device will be illustrated further in FIGS. 11A-11G.

Figure 11B:
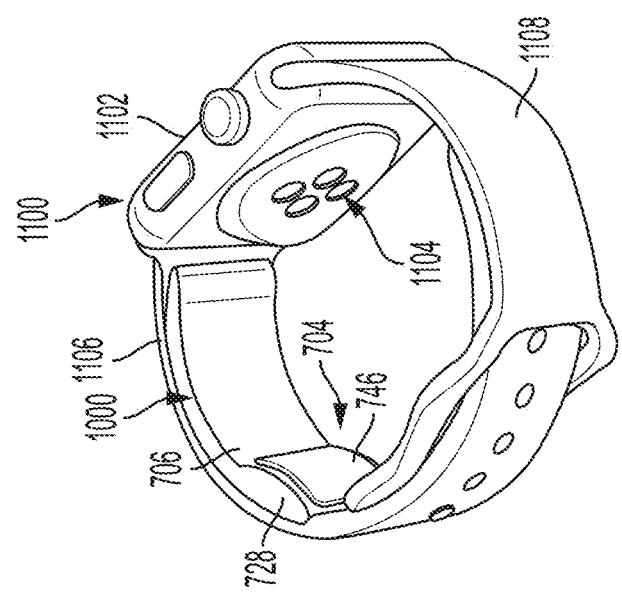
Figure 11C:
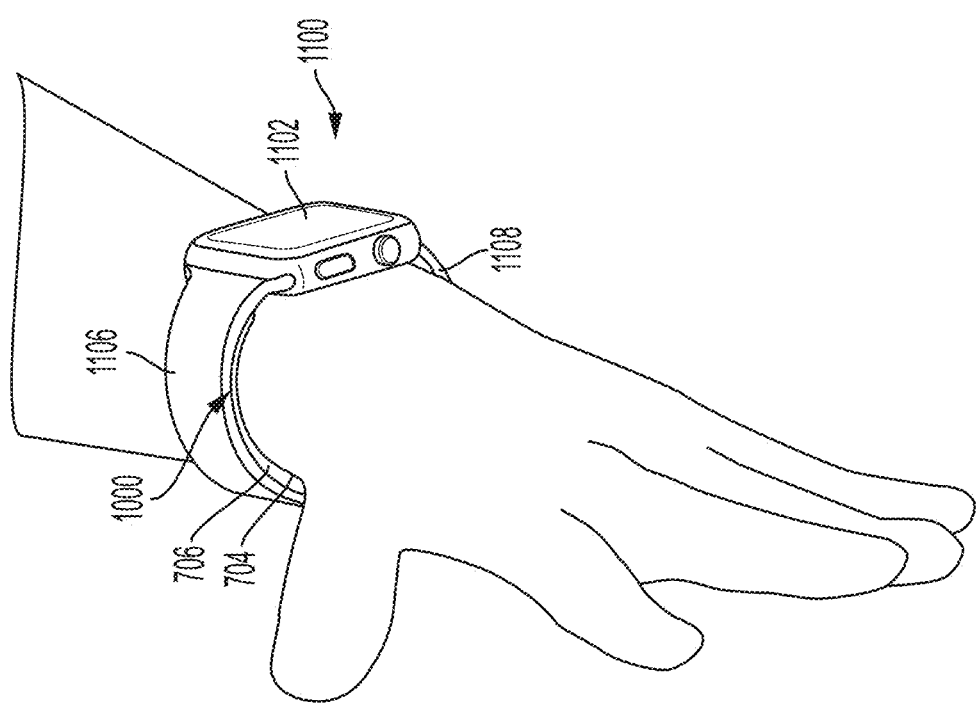
Figure 11D:
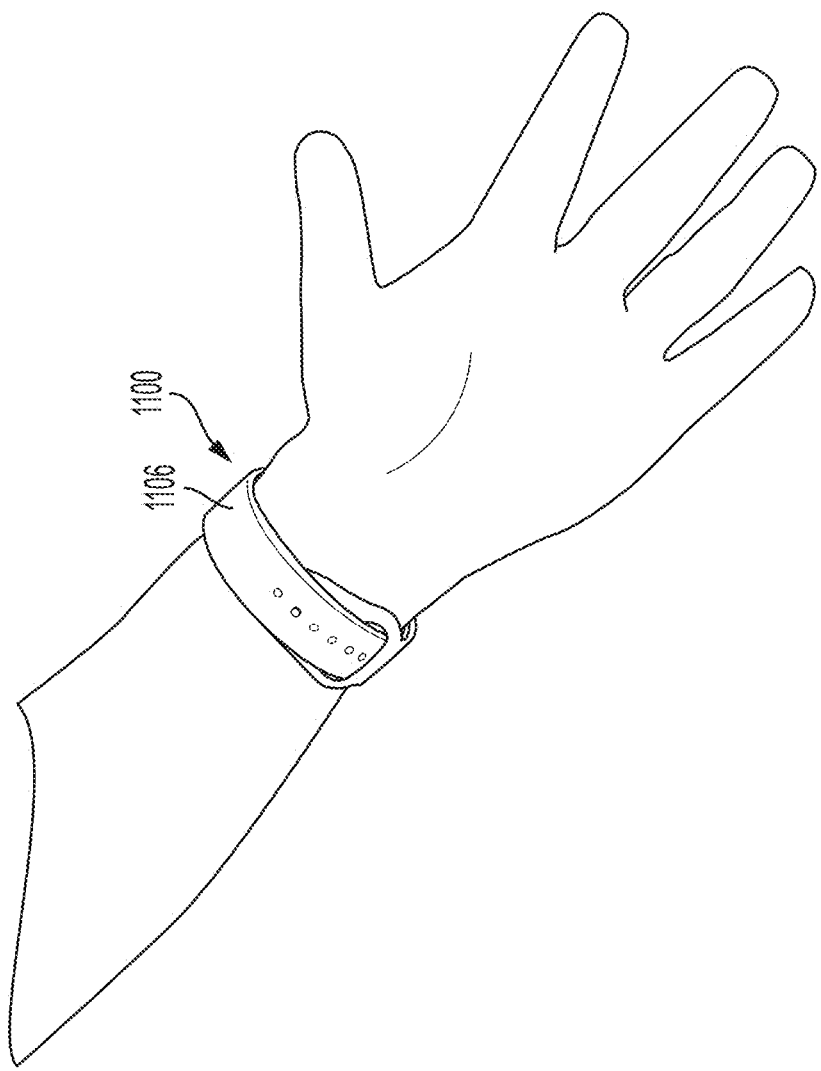
Figure 11E:
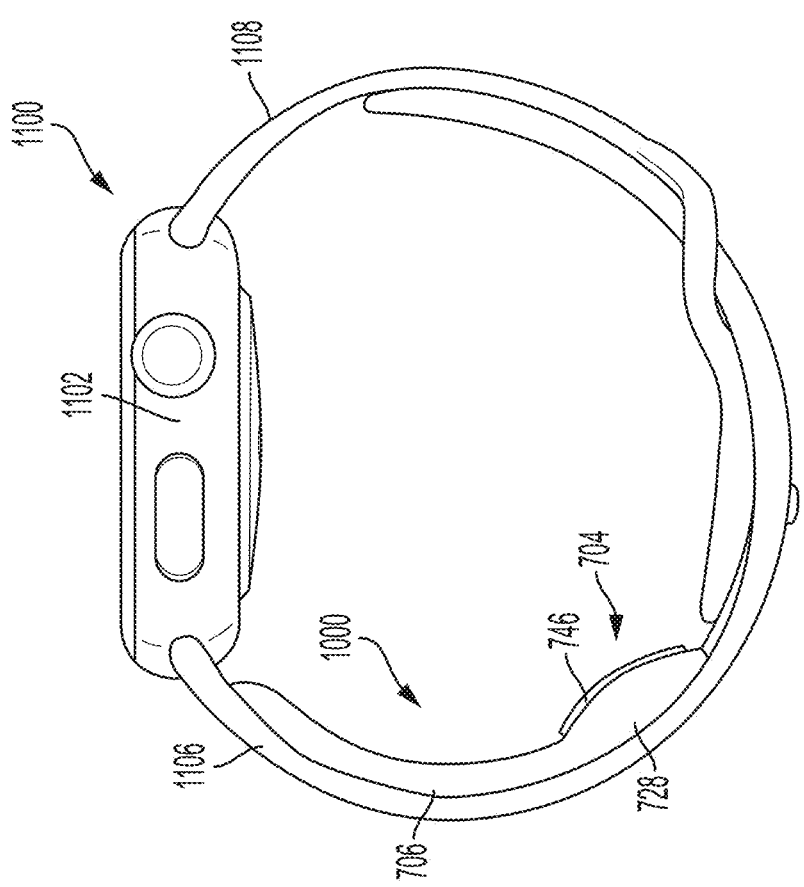
Figure 11F:
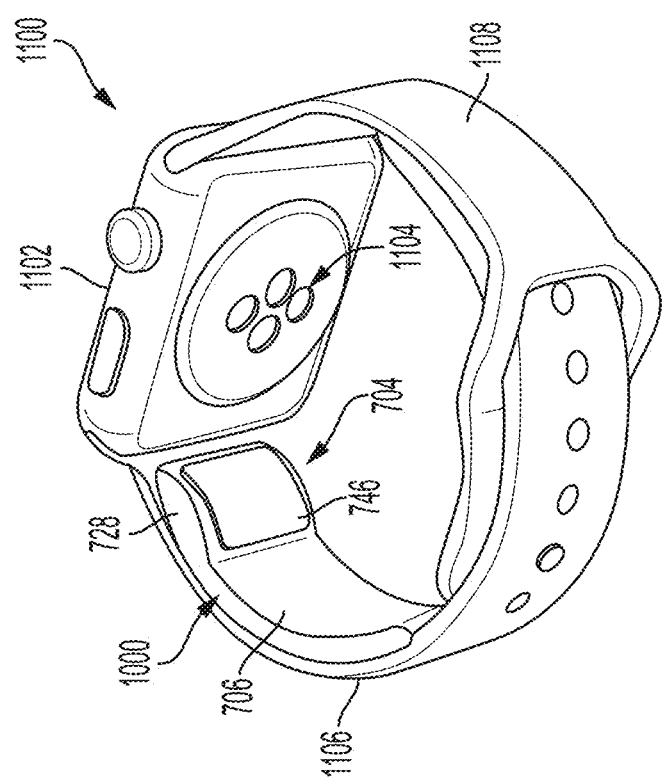
Figure 11G:
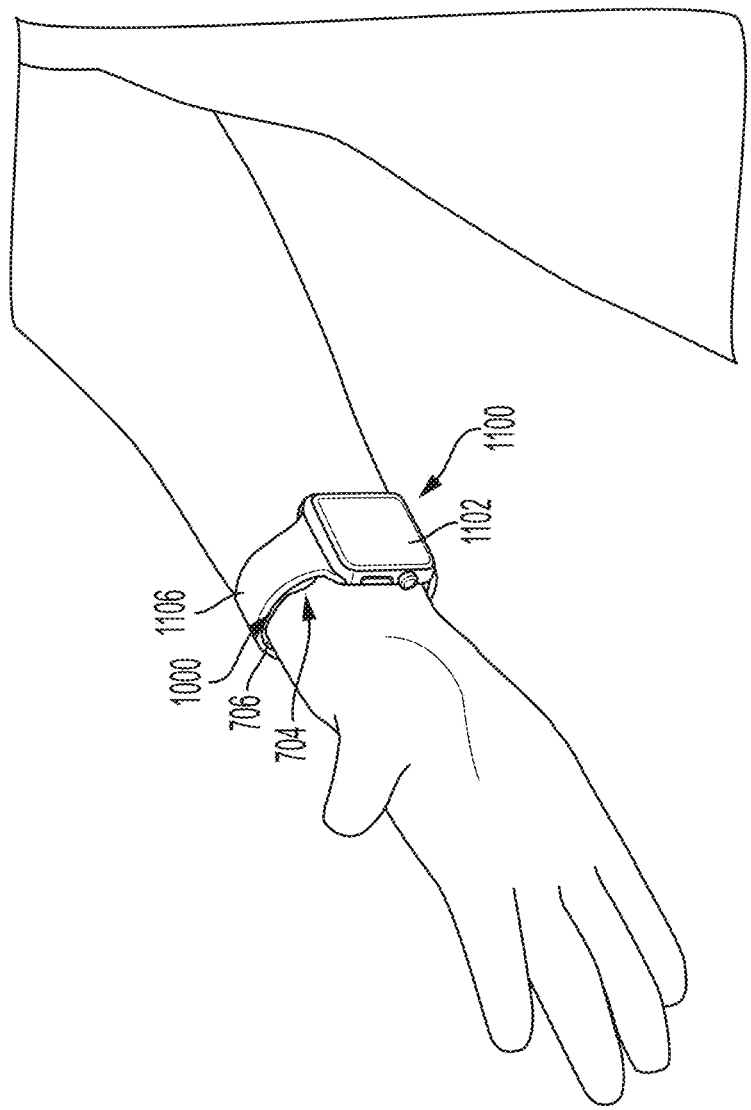

FIGS. 11A-11G show examples of a wearable device for ultrasound data collection configured to be bound to a user's wrist when the wearable device is assembled and worn. FIG. 11A shows the assembled wearable device 1000 and a user's personal wrist device 1100 prior to coupling the wearable device 1000 to the wrist device 1100. The wearable device 1000 includes the ultrasound module 704, the first wristband 706, the ultrasound housing module 728, and the acoustic lens 746. The coupling element 748 is not shown in FIG. 11A. The wrist device 1100 includes a primary module 1102, a first wristband 1106, and a second wristband 1108. FIG. 11B shows the wearable device 1000 coupled to the wrist device 1100. In particular, the first wristband 706 is coupled along its longitudinal axis to the first wristband 1106 along its longitudinal axis. The wearable device 1000 is oriented such that the ultrasound module 704 is distal from the primary module 1102 of the wrist device 1100. FIG. 11B also shows sensors 1104 integrated on the surface of the primary module 1102. For example, the sensors may be blood alcohol level, glucose level, blood oxygenation level, microphone, heart rate, ultraviolet, electromyography (EMG), and/or galvanic skin response sensors. FIGS. 11C and 11D show the wearable device 1000 coupled to the wrist device 1100 while being worn. FIG. 11C shows the dorsal wrist and FIG. 11D shows the volar wrist. The wearable device 1000 is oriented in the orientation of FIG. 11B, namely with the wearable device 1000 oriented such that the ultrasound module 704 is distal from the primary module 1102 of the wrist device 1100. FIG. 11E shows a side view of the wearable device 1000 coupled to the wrist device 1100 in the orientation of FIG. 11B, namely with the wearable device 1000 oriented such that the ultrasound module 704 is distal from the primary module 1102 of the wrist device 1100. FIG. 11F shows the wearable device 1000 coupled to the wrist device 1100 in a different orientation than in FIG. 11B. In particular, the wearable device 1000 is coupled to the first wristband 1106 such that the ultrasound module 704 is proximal to the primary module 1102 of the wrist device 1100. FIG. 11G shows the wearable device 1000 coupled to the wrist device 1100 while being worn. The wearable device 1000 is oriented in the orientation of FIG. 11F, namely with the wearable device 1000 oriented such that the ultrasound module 704 is proximal to the primary module 1102 of the wrist device 1100.

Figure 12:
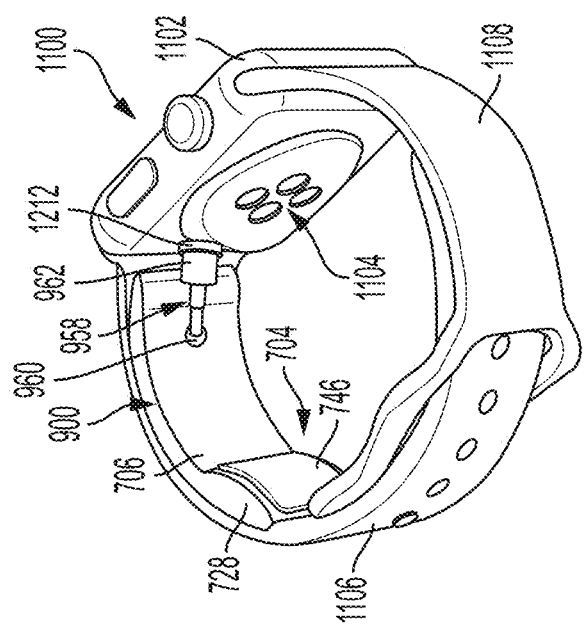
FIG. 12 shows an example of the wearable device of FIG. 9 when electrically coupled to a user's personal wrist device.

FIG. 12 shows an example of the wearable device 900 when electrically coupled to the user's personal wrist device 1100. The wrist device 1100 further includes a female port 1212. The wearable device 900 includes the connection cable 958 that exits from the first wristband 706 through the opening 960 in the first wristband 706. The connection cable 958 has the male connector 962, which is plugged into the complementary female port 1212 in the wrist device 1100. In some embodiments, the connection cable 958 includes a female connector instead of, or in addition to, the male connector 962, and the wrist device 1100 includes a male port (instead of or in addition to the female port 1212) into which the female connector plugs. In some embodiments, a clasp on the wristband of the wrist device 1100 has pins to which the connector (male or female) on the connection cable 958 may electrically couple.

In some embodiments, instead of or in addition to using a wristband to bind the ultrasound-on-a-chip device to the user's wrist, other means such as adhesives or clamps may be used.

Figure 13:
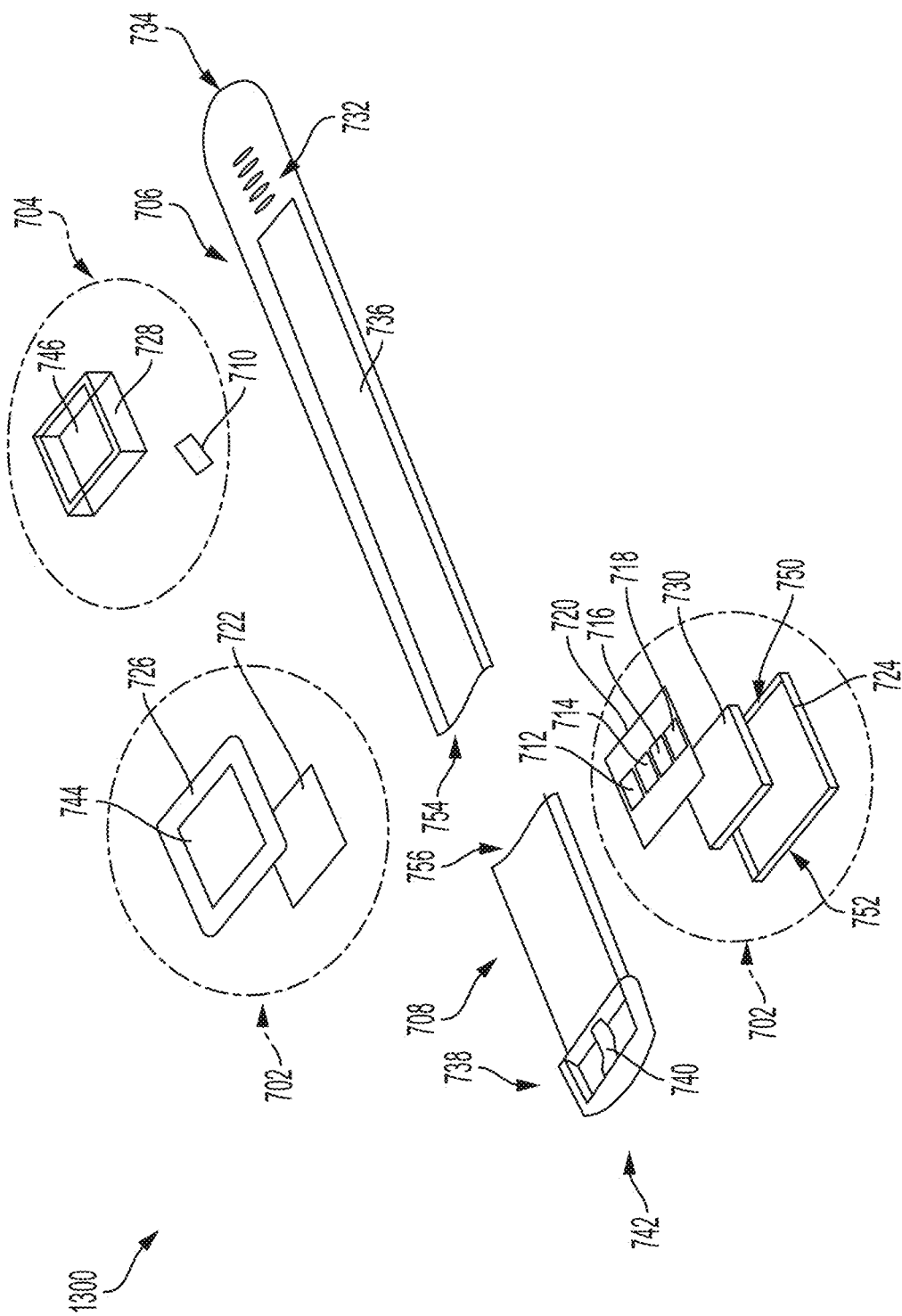
FIG. 13 shows another example of a wearable device for ultrasound data collection configured to be worn on a user's wrist, in accordance with certain embodiments disclosed herein.

FIG. 13 shows another example of a wearable device 1300 for an ultrasound-on-a-chip device configured to be worn on a user's wrist, in accordance with certain embodiments disclosed herein. The wearable device 1300 differs from the wearable device 700 in that the ultrasound module 704 in the wearable device 1300 is coupled to the opposite side of the first wristband 706 as the ultrasound module 704 in the wearable device 700. In other words, when a user wears the wearable device 900 on his/her wrist, the ultrasound module 704 is coupled to the surface of the first wristband 706 that does not face the user's wrist. The opening 746 in the ultrasound housing element 728 faces away from the user's wrist, and the ultrasound transducers on the ultrasound-on-a-chip 710 are oriented to face the opening 746 and are configured to transmit ultrasound signals through the opening 746.

Because the ultrasound transducers face away from the user's wrist, the ultrasound module 704 is configured to transmit ultrasound signals away from the wrist of the user on which the wearable device 1300 resides. The wearable device 1300 may therefore be able to collect ultrasound data from other portions of the user's body, besides the wrist of which the wearable device 1300 resides, while those portions of the user's body are performing gestures. For example, if the wearable device 1300 resides on the user's left wrist, the wearable device 1300 may be able to collect data using over-the-air ultrasound from the user's right hand, right fingers, right wrist, right arm, left hand, left fingers, and/or left arm. When collecting ultrasound data from the opposite upper limb than the limb on which the wearable device 1300 resides, the user may point the ultrasound transducers on the wearable device 1300 towards the opposite limb. When collecting ultrasound data from the same limb as the limb on which the wearable device 1300 resides, the user may wear the wearable device 1300 on the dorsal wrist or the volar wrist. Certain gestures may be easier to detect in such embodiments when the wearable device 1300 resides on the dorsal wrist or the volar wrist. For example, gestures in which the hand or fingers bend towards the dorsal wrist may be easier to detect when the wearable device 1300 resides on the dorsal wrist, and gestures in which the hand or fingers bend towards the volar wrist may be easier to detect when the wearable device 1300 resides on the volar wrist. The ability of the ultrasound module 704 to collect ultrasound data from other portions of the user's body may depend on the ultrasound module 704 being configured to transmit ultrasound energy having a frequency (e.g., in the kHz range) that enables the ultrasound energy to travel to other portions of the user's body through air without undue attenuation. Because the ultrasound signals travels through air, the coupling element 748 is not necessary.

Figure 14:
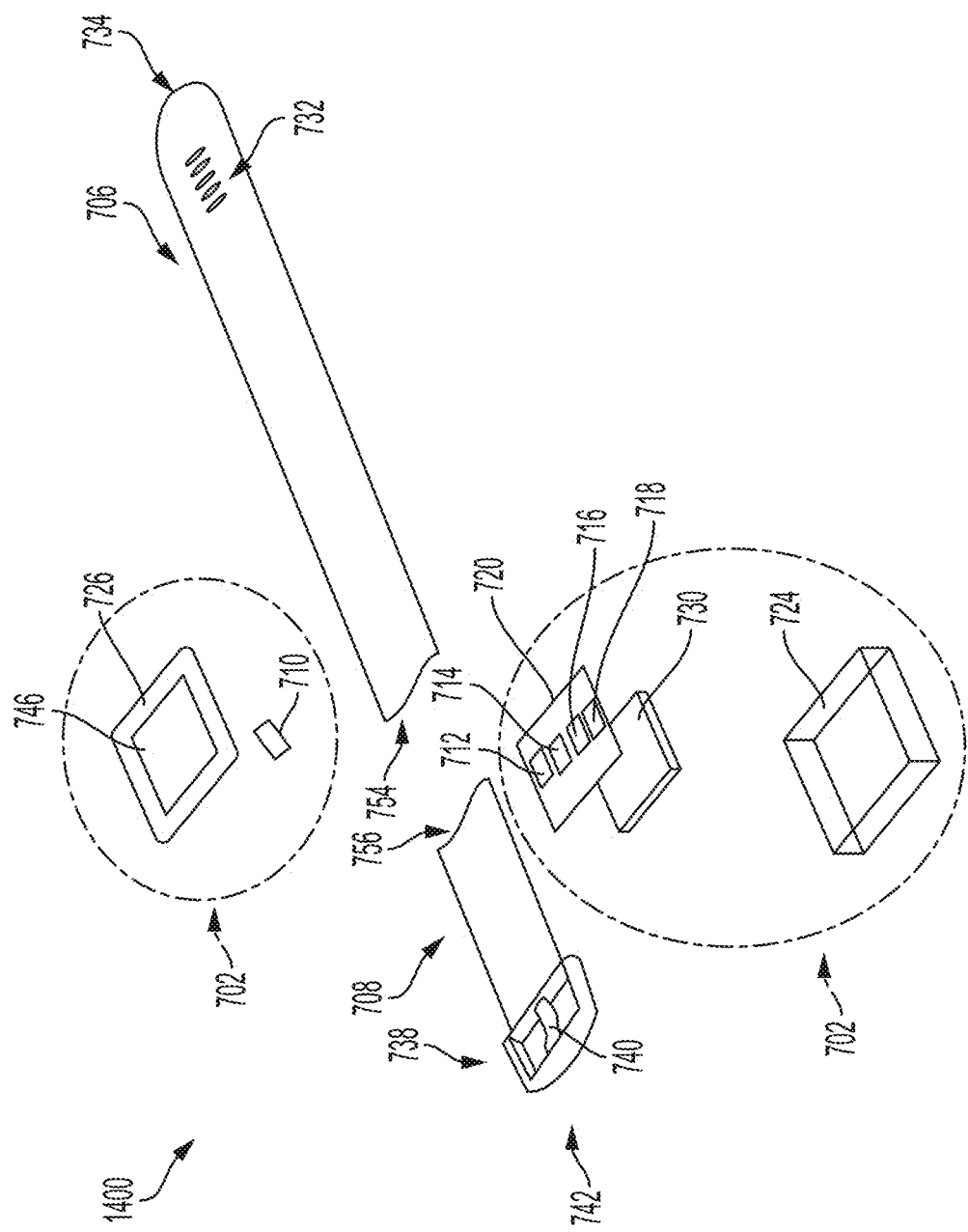
FIG. 14 shows another example of a wearable device for ultrasound data collection configured to be worn on a user's wrist, in accordance with certain embodiments disclosed herein.

FIG. 14 shows another example of a wearable device 1400 for an ultrasound-on-a-chip device configured to be worn on a user's wrist, in accordance with certain embodiments disclosed herein. The wearable device 1400 differs from the wearable device 800 in that the ultrasound-on-a-chip 710 is located on the opposite side of the first wristband 706 and the second wristband 708 as the ultrasound-on-a-chip 710 in the wearable device 800. In other words, the ultrasound-on-a-chip 710 in the wearable device 1400 is located proximal to the primary housing element 726 rather than the primary housing element 724. Furthermore, the wearable device 1400 differs from the wearable device 800 in that the primary housing element 726 includes the opening 746 (rather than the primary housing element 724 including the opening 746) and lacks the display screen 722 and the opening 744. Additionally, the ultrasound transducers on the ultrasound-on-a-chip 710 face the opening 746 and are configured to transmit ultrasound signals through the opening 746. Like the wearable device 1300, because the ultrasound transducers face away from the user's wrist in the wearable device 1400, the ultrasound module 704 is configured to transmit ultrasound signals away from the wrist of the user on which the wearable device 1400 resides. The wearable device 1400 may therefore be able to collect ultrasound data from of other portions of the user's body, besides the wrist of which the wearable device 900 resides, while those portions of the user's body are performing gestures. For example, if the wearable device 1400 resides on the user's left wrist, the wearable device 1400 may be able to collect data using over-the-air ultrasound from the user's right hand, right fingers, right wrist, right arm, left hand, left fingers, and/or left arm. When collecting ultrasound data from the opposite upper limb than the limb on which the wearable device 1400 resides, the user may point the ultrasound transducers on the wearable device 1400 towards the opposite limb. When collecting ultrasound data from the same limb as the limb on which the wearable device 1400 resides, the user may wear the wearable device 1400 on the dorsal wrist or the volar wrist. Certain gestures may be easier to detect in such embodiments when the wearable device 1400 resides on the dorsal wrist or the volar wrist. For example, gestures in which the hand or fingers bend towards the dorsal wrist may be easier to detect when the wearable device 1400 resides on the dorsal wrist, and gestures in which the hand or fingers bend towards the volar wrist may be easier to detect when the wearable device 1400 resides on the volar wrist.

It should be appreciated that by increasing the length of the wristbands in the wearable devices discussed herein, the wearable devices may be configured to be bound to other portions of the upper limb, such as the forearm. It may be helpful to collect data from one particular portion of the upper limb rather than other portions because, depending on the muscles located at the respective portions of the upper limb, it may be possible to identify gestures being performed more easily and/or more accurately based on ultrasound data collected from that particular portion of the upper limb rather than other portions.

It should be appreciated that while the wearable devices discussed above may include ultrasound-on-a-chip devices having two-dimensional arrays of ultrasound transducers, the wearable device may not need to analyze data collected from each ultrasound transducer in the array to identify a gesture being performed. In some embodiments, the wearable device may use data from a subset of the ultrasound transducers in the array to identify a gesture being performed. It should also be appreciated that the wearable device may not need to analyze ultrasound images (i.e., images reconstructed from ultrasound data) to identify a gesture being performed. In some embodiments, the wearable device may use raw acoustical data, or raw acoustical data converted into a non-image form, to identify a gesture being performed. In other embodiments, the wearable device may convert collected ultrasound data into ultrasound images and use the ultrasound images to identify a gesture being performed.

In some embodiments, the wearable device may use low power techniques to monitor for gesture changes. For example, the wearable device may continuously collect low-bandwidth ultrasound data (e.g., data from a subset of ultrasound transducers in an array). The low-bandwidth ultrasound data may be sufficient to detect a muscle movement occurring, while still operating at an acceptably low power state. Once a muscle movement is detected, high-bandwidth ultrasound data (e.g., data collected from all the ultrasound transducers in the array) may be collected and used to identify the gesture being performed. As another example, other sensors (e.g., electromyography sensors in the wearable device) may be used to continuously monitor for muscle movement, while still operating at an acceptably low power state. Once a muscle movement is detected, high-bandwidth ultrasound data (e.g., data collected from all the ultrasound transducers in the array) may be collected and used to identify the gesture being performed. In this example, ultrasound data may not be collected until the other sensors detect muscle movement. As another example, the wearable device may collect ultrasound data over the air from the upper limb on which the wearable device resides (e.g., using a subset of the ultrasound transducers in an outward facing array). One ultrasound beam profile may be able to cover the entirety of a region of interest (e.g., the hand). Once a movement of the upper limb is detected, high-bandwidth ultrasound data (e.g., data collected from all the ultrasound transducers in the array) may be collected and used to identify the gesture being performed.

As discussed above, in some embodiments, the ultrasound module may include a two-dimensional array of ultrasound transducers. In such embodiments, it may be possible to use beamforming to focus ultrasound signals along a particular direction, such as parallel to the longitudinal axis of the upper limb, perpendicular to the longitudinal axis of the upper limb, or diagonal to the longitudinal axis of the upper limb. Additionally, it may be possible to vary the frequency of the ultrasonic signals such that the ultrasound module collects data from structures located at a particular depth within the user's wrist. Muscles at a certain depth within the user's wrist may show more distinguishable changes for a given set of gestures in ultrasound data/images, and the frequency can be chosen accordingly to choose the optimal depth.

As discussed above, the coupling element 748 is configured to reduce the air gap between the ultrasound module 704 and the user's wrist. In particular, the coupling element 748 is configured to couple to the acoustic lens 746 and establish acceptable impedance matching coupling for ultrasound signal transmission and reception. In some embodiments, therefore, the coupling element 748 may be considered an impedance matching strip, or an impedance matching coupler. To reduce the air gap between the ultrasound module 704 and the user's wrist, the coupling element 748 may be configured to be flexible such that the coupling element 748 conforms to the irregular surface of the user's wrist.

In some embodiments, the coupling element 748 includes a solid material and liquid absorbed within the solid material to increase the flexibility of the coupling element 748. In some embodiments, the liquid includes a hydrophilic solution. In such embodiments, the coupling element 748 may be configured to be refreshed with addition of water to the coupling element 748 to reduce drying of the coupling element and to maintain acceptable conformity of the coupling element to the user's wrist. For example, the coupling element 748 may be refreshed with water in a shower, by dipping the coupling element 748 in water, or by running water over the coupling element 748. In some embodiments, the coupling element 748 includes a porous sponge that stores water and releases the water slowly, and can be refreshed with addition of water to the porous sponge. In some embodiments, the liquid includes a hydrophobic solution. In such embodiments, the coupling element 748 is configured to be refreshed with oil, gel, or another hydrophobic consumable to reduce drying of the coupling element 748 and maintain acceptable conformity of the coupling element 748 to the user's wrist. In some embodiments, the wearable device (in particular, the ultrasound module 704 and the primary module 702) is configured to be waterproof so that if, for example, the ultrasound module 704 and the primary module 702 become wet while the coupling element 748 is being refreshed, the ultrasound module 704 and the primary module 702 continue to function. For example, the ultrasound housing element 728 and the primary housing elements 724 and 726 may be waterproof housings.

In some embodiments, the coupling element 748 is configured to be replaceable. For example, the coupling element 748 may include an adhesive layer between the coupling element 748 and the surface of the ultrasound module 704, and to replace the coupling element 748, a user may peel the coupling element 748 from the ultrasound module 704 and attach another coupling element 748 to the ultrasound module 704.

Materials used in the coupling element 748 may include a rubber material (which may be water-absorbent), a rubberized coating material, a silicone-based material, a gel-based material (e.g., the coupling element 748 may include a gel pad), an agar-based material, and a room-temperature-vulcanization silicone material. In some embodiments, the coupling element 748 includes a rubbery silicone material that is sufficiently flexible to maintain acceptable contact with the user's wrist without requiring replacement. In some embodiments, the coupling element 748 may include a spongy material that is capable of absorbing liquid and being refreshed with water (e.g., by splashing the coupling element 748 with water, by dipping the coupling element 748 in water, by taking a shower or bath, and/or by cleaning the coupling element 748 with water) in order to maintain conformity of the coupling element 748 to the user's wrist. In such embodiments, the spongy material may release the absorbed liquid at an acceptably low rate such that the coupling element 748 requires refreshing at an acceptably low frequency.

In some embodiments, the ultrasound module 704 lacks a coupling element, and the user may wet the wrist area (e.g., by dipping the wrist in water or running water over the first) prior to data collection to establish proper impedance matching coupling for ultrasound signal transmission and reception. Accordingly, the ultrasound module 704 can operate ultrasound gel-less. In such embodiments, the ultrasound module is configured to be waterproof. For example, the ultrasound housing element 728 may be a waterproof housing.

Figure 15:
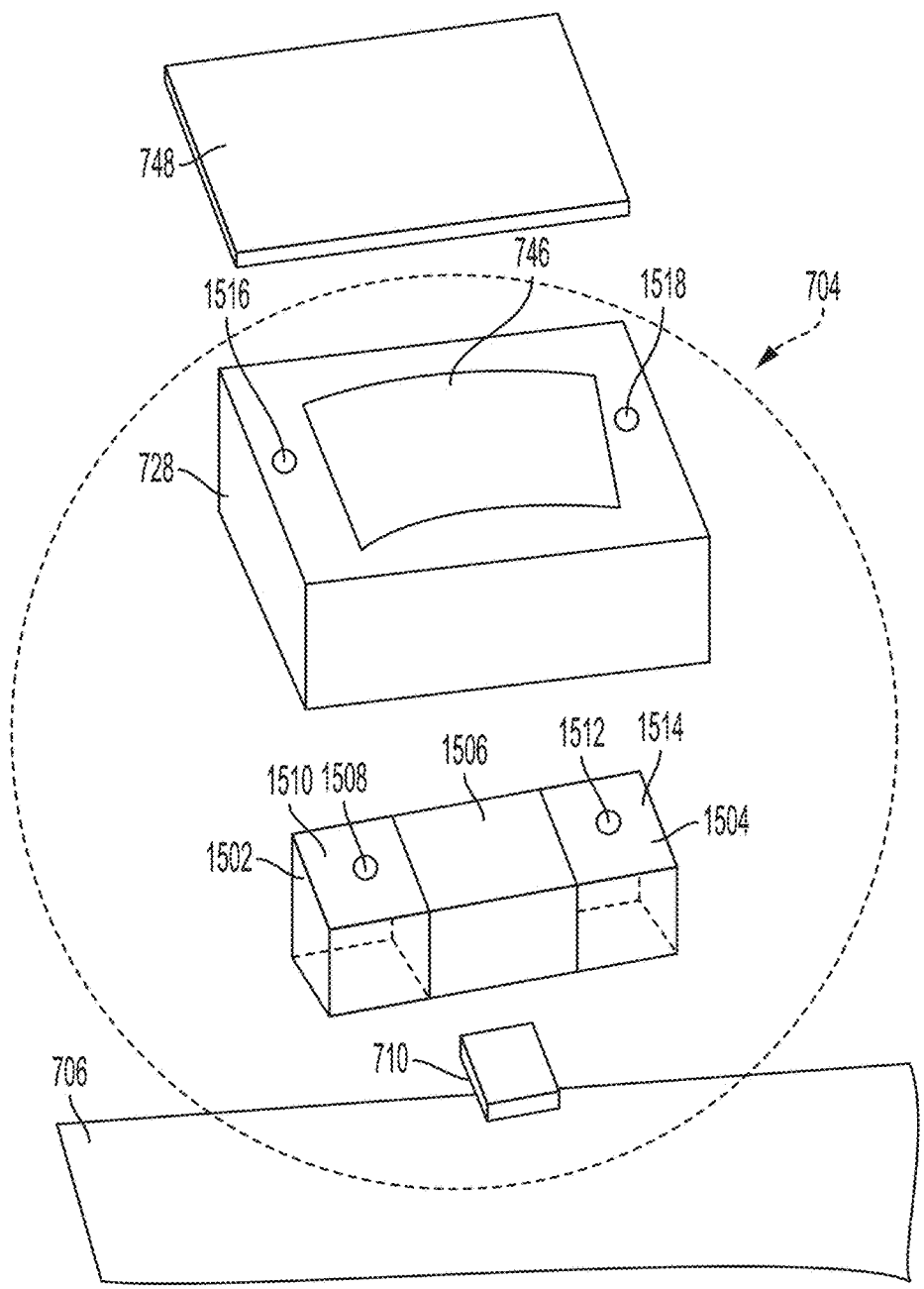
FIG. 15 shows an example in which the ultrasound module of FIG. 7 includes reservoirs for refreshing the coupling element of FIG. 7 in accordance with certain embodiments described herein.

FIG. 15 shows an example in which the ultrasound module 704 includes reservoirs for refreshing the coupling element 748 in accordance with certain embodiments described herein. In FIG. 15, the ultrasound module 704 includes the ultrasound-on-a-chip device 710, reservoirs 1502 and 1504, and cover 1506. The reservoir 1502 includes a valve 1508 and a door 1510. The reservoir 1504 includes a valve 1512 and a door 1514. The ultrasound housing element 728 includes openings 1516 and 1518.

The ultrasound housing element 728 and the first wristband 706 enclose the reservoirs 1502 and 1504, the ultrasound-on-a-chip device 710, and the cover 1506. The cover 1506, which is hollow, covers the ultrasound-on-a-chip device 710 and, together with the ultrasound housing element 728, form an enclosure for the ultrasound-on-a-chip device 710. The coupling element 748 is attached to the surface of the ultrasound housing element 728.

The valve 1508 opens into the opening 1516 and the valve 1512 opens into the opening 1518. The reservoirs 1502 and 1504 contain liquid or gel. The valve 1508 is configured to release liquid or gel from the reservoir 1502, through the opening 1516, and into the coupling element 748. The valve 1512 is configured to release liquid or gel from the reservoir 1502, through the opening 1518, and into the coupling element 748.

The liquid or gel in the reservoirs 1502 and 1504 may be hydrophilic or hydrophobic. As discussed above, the reservoirs 1502 and 1504 are configured to refresh the coupling element 748 with the liquid or gel. In particular, the reservoirs 1502 and 1504 are configured to add the liquid or gel to the coupling element 748, which may absorb the liquid or gel. Adding the liquid or gel to the coupling element 748 may help to reduce drying of the coupling element 748 and maintain acceptable conformity of the coupling element 748 to the user's wrist.

The valves 1508 and 1512 may be mechanically or electrically activated. In some embodiments, the user may trigger the valves 1508 and 1512 to release liquid or gel from the reservoirs 1502 and 1504 into the coupling element 748. In some embodiments, the user may apply mechanical pressure to the ultrasound module 704, either by directly applying mechanical pressure to the ultrasound module 704 or by applying mechanical pressure to another element to which the ultrasound module 704 is coupled (e.g., the first wristband 706), and the mechanical pressure may trigger the valves 1502 and 1512 to release at least a portion of the liquid or gel from the reservoirs 1502 and 1504 into the coupling element 748. For example, mechanical pressure applied to the ultrasound module 704 may compress the reservoirs 1502 and 1504 and cause them to expel liquid or gel through the valves 1508 and 1512. In some embodiments, the user may apply the mechanical pressure to recesses in the first wristband 706. In some embodiments, the user may place his or her fingers over sensors on the first wristband 706 and the sensors may transmit an electrical signal to the valves 1508 and 1512 to release the liquid or gel from the reservoirs 1502 and 1504 into the coupling element 748. In some embodiments, the user may activate a button (e.g., a mechanical button or a virtual button) and activation of the button may transmit an electrical signal to the valves 1508 and 1512 to release liquid or gel from the reservoirs 1502 and 1504 into the coupling element 748.

In some embodiments, processing circuitry may be configured to automatically trigger the valves 1508 and 1512 to release the liquid or gel from the reservoirs 1502 and 1504 into the coupling element 748. The processing circuitry may be processing circuitry 712 or processing circuitry in an external host device (e.g., a smartphone, tablet device, or laptop), workstation, or server. For example, the processing circuitry may be configured to trigger the valves 1508 and 1512 to release the liquid or gel from the reservoirs 1502 and 1504 into the coupling element 748 periodically. In some embodiments, the processing circuitry may be configured to trigger the valves 1508 and 1512 to release the liquid or gel from the reservoirs 1502 and 1504 into the coupling element 748 based on detecting that the coupling element 748 needs to be refreshed with liquid or gel. In some embodiments, detecting that the coupling element 748 needs to be refreshed with liquid or gel includes determining whether a current amount of liquid or gel associated with the coupling element 748 is below a threshold amount. In some embodiments, to detect that the coupling element 748 needs to be refreshed with liquid or gel 424, the processing circuitry may be configured to analyze (continuously or periodically) ultrasound data collected by the ultrasound-on-a-chip device 710 and determine whether the collected ultrasound data shows signs (e.g., decreased quality of images) that the coupling element 748 is conforming poorly to the user's wrist. In some embodiments, to detect that the coupling element 748 needs to be refreshed with liquid or gel, the processing circuitry may be configured to receive signals from a moisture sensor in or adjacent to the coupling element 748 indicating that the moisture level in or adjacent to the coupling element 748 is below a threshold moisture level. In some embodiments, the processing circuitry may be configured to use other sensors to detect that the coupling element 748 needs to be refreshed, such as capacitive sensors or skin conductivity sensors. In some embodiments, the processing circuitry may detect that the coupling element 748 needs to be refreshed with liquid or gel and generate a notification that the user needs to refresh the coupling element 748 with liquid or gel. In some embodiments, the notification may be displayed on the display screen 722. In some embodiments, the notification displayed on the display screen 722 may include text, an image, and/or a video. In some embodiments, the notification may include audio output from the primary module 702.

The door 1510 can be opened to reveal an inside cavity of the reservoir 1502 and enable refilling of the reservoir 1502 with liquid or gel. The door 1514 can be opened to reveal an inside cavity of the reservoir 1504 and enable refilling of the reservoir 1504 with liquid or gel. To refill the reservoirs 1502 and 1504, a user may remove the ultrasound housing element 728 from the first wristband 706, thereby revealing the reservoirs 1502 and 1504. The user may open the doors 1510 and 1514 and then run liquid or gel over the reservoirs 1502 and 1504, dip the reservoirs 1502 and 1504 into liquid or gel, or take a shower in order to add liquid to the reservoirs 1502 and 1504. The ultrasound-on-a-chip device 710 may be protected from damage during the refilling process by the cover 1506, which forms an enclosure for the ultrasound-on-a-chip device 710, and may be waterproof. In some embodiments, the reservoirs 1502 and 1504 may be removable in order to allow the user to refill the reservoirs 1502 and 1504 without risking damage to the ultrasound-on-a-chip device 710. In some embodiments, the door 1510 may be any type of input port.

In some embodiments, the reservoirs 1502 and 1504 may be coupled together as a single part, and/or may be connected together such that the reservoirs 1502 and 1504 constitute one reservoir. In some embodiments, one of the reservoirs 1502 and 1504 is absent, or there may be more than two reservoirs. In some embodiments, tubes may connect the reservoirs 1502 and 1504 to the coupling element 748. In such embodiments, the reservoirs 1502 and 1504 may not be located adjacent to the coupling element 748. In embodiments in which the ultrasound-on-a-chip device 710 is located within the primary module 702, the reservoirs 1502 and 1504 may be located within the primary module 702 as well. In some embodiments, the cover 1506 may be absent. In some embodiments, other means for refilling the reservoirs 1502 and 1504 may be included, such as valves.

Other embodiments of reservoirs for refreshing the coupling element 748 with liquid or gel are possible, such as reservoirs without valves. For example, in some embodiments, the reservoir includes an amorphous surface from which gel can be squeezed out like a sponge. In some embodiments, the reservoir includes a sponge-like material coupled through a restriction to the coupling element 748 such that the reservoir may slowly release liquid or gel to refresh the coupling element 748.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

The following exemplary embodiments are presented to further illustrate the disclosed principles. These examples are illustrative and non-limiting.

Example 1 is directed to a system for training a wearable device to perform gesture recognition, comprising: a memory circuitry; a processing circuitry in communication with the memory circuitry, the processing circuitry configured to: obtain, from the wearable device, ultrasound data corresponding to an anatomical gesture; obtain non-ultrasound data corresponding to the anatomical gesture; and train a machine learning model accessed by the wearable device to recognize the anatomical gesture by correlating the non-ultrasound data and the ultrasound data.

Example 2 is directed to the system of example 1, wherein the wearable device comprises one of a wristwatch or a wristband configured with an ultrasound-on-a-chip.

Example 3 is directed to the system of example 2, wherein the wearable device further comprises one or more position sensors.

Example 4 is directed to the system of example 3, wherein the one or more position sensors comprise one or more accelerometers, gyroscopes, magnetometers, compasses, and global positioning systems (GPS).

Example 5 is directed to the system of example 3, wherein the processing circuitry is further configured to obtain the non-ultrasound data using the one or more position sensors.

Example 6 is directed to the system of example 1, wherein the processing circuitry is configured to obtain the non-ultrasound data using an image capture device, the image capture device further comprising one of a camera, a smartphone or a tablet device.

Example 7 is directed to the system of example 1, wherein the anatomical gesture comprises one of a hand gesture, a finger gesture, a wrist gesture and/or an arm gesture.

Example 8 is directed to a method to train a wearable device to perform gesture recognition, comprising: obtaining, with the wearable device, ultrasound data corresponding to an anatomical gesture; obtaining non-ultrasound data corresponding to the anatomical gesture; and training a machine learning model accessible to the wearable device to recognize the anatomical gesture based on correlating the non-ultrasound data and the ultrasound data.

Example 9 is directed to the method of example 8, wherein the wearable device comprises one of a wristwatch or a wristband.

Example 10 is directed to the method of example 9, wherein the wearable device further comprises an ultrasound-on-a-chip device.

Example 11 is directed to the method of example 10, wherein the wearable device further comprises one or more position sensors.

Example 12 is directed to the method of example 11, further comprising obtaining the non-ultrasound data using the one or more position sensors.

Example 13 is directed to the system of example 12, wherein the one or more position sensors comprise one or more accelerometers, gyroscopes, magnetometers, compasses, and global positioning systems (GPS).

Example 14 is directed to the method of example 8, further comprising obtaining the non-ultrasound data using an image capture device.

Example 15 is directed to the method of example 14, wherein the image capture device comprises one of a camera, a smartphone, or a tablet device.

Example 16 is directed to the method of example 8, wherein the anatomical gesture comprises one of a hand gesture, a finger gesture, a wrist gesture and/or an arm gesture.

Example 17 is directed to a non-transitory computer-readable storage medium storing processor-executable instructions that, when executed by at least one processor, cause the at least one processor to: obtain, from a wearable device, ultrasound data corresponding to an anatomical gesture; obtain non-ultrasound data corresponding to the anatomical gesture; and train a machine learning model accessed by the wearable device to recognize the anatomical gesture based on correlating the non-ultrasound data and the ultrasound data.

Example 18 is directed to the non-transitory computer-readable storage medium of example 17, wherein the wearable device comprises one of a wristwatch or a wristband.

Example 19 is directed to the non-transitory computer-readable storage medium of example 18, wherein the wearable device further comprises an ultrasound-on-a-chip device.

Example 20 is directed to the non-transitory computer-readable storage medium of example 19, wherein the wearable device further comprises one or more position sensors.

Example 21 is directed to the non-transitory computer-readable storage medium of example 20, wherein the one or more position sensors comprise one or more accelerometers, gyroscopes, magnetometers, compasses, and global positioning systems (GPS).

Example 22 is directed to the non-transitory computer-readable storage medium of example 20, further storing processor-executable instructions that, when executed by the at least one processor, cause the at least one processor to obtain the non-ultrasound data using the one or more position sensors.

Example 23 is directed to the non-transitory computer-readable storage medium of example 17, further storing processor-executable instructions that, when executed by the at least one processor, cause the at least one processor to obtain the non-ultrasound data using an image capture device.

Example 24 is directed to the non-transitory computer-readable storage medium of example 23, wherein the image capture device comprises one of a camera, a smartphone, or a tablet device.

Example 25 is directed to the non-transitory computer-readable storage medium of example 17, wherein the anatomical gesture comprises one of a hand gesture, a finger gesture, a wrist gesture and/or an arm gesture.

Example 26 is directed to the apparatus for interfacing with a computing device, comprising: a wearable device configured to: identify an anatomical gesture using ultrasound data obtained by the wearable device; and cause the computing device to perform a specific function based on the anatomical gesture identified by the wearable device.

Example 27 is directed to the apparatus of example 26, wherein the computing device comprises one of a smartphone, a tablet device, a computer, a virtual reality system, or the wearable device itself and wherein the wearable device comprises one of a wristwatch or a wristband.

Example 28 is directed to the apparatus of example 26, wherein the wearable device further comprises an ultrasound-on-a-chip device.

Example 29 is directed to the apparatus of example 28, wherein the wearable device further comprises one or more ultrasound transducers acoustically coupled to an anatomical feature on which the wearable device resides.

Example 30 is directed to the apparatus of example 29, wherein the one or more ultrasound transducers are configured to operate at a frequency range selected to acquire the ultrasound data from within the anatomical feature.

Example 31 is directed to the apparatus of example 29, wherein the wearable device further comprises an ultrasound gel pad, configured to be disposed between the one or more ultrasound transducers and the anatomical feature on which the wearable device resides.

Example 32 is directed to the apparatus of example 28, wherein the wearable device further comprises one or more ultrasound transducers disposed in an outward direction with respect to a first anatomical feature on which the wearable device resides.

Example 33 is directed to the apparatus of example 32, wherein the one or more ultrasound transducers are configured to operate at a frequency range selected to acquire the ultrasound data from a second anatomical feature on which the wearable device does not reside.

Example 34 is directed to the apparatus of example 32, wherein the anatomical gesture comprises one of a hand gesture, a finger gesture, a wrist gesture and/or an arm gesture.

Example 35 is directed at least one non-transitory computer-readable storage medium storing processor-executable instructions that, when executed by at least one processor, cause the at least one processor to: identify, with a wearable device, an anatomical gesture using ultrasound data obtained by the wearable device; and cause a computing device to perform a specific function based on the anatomical gesture identified by the wearable device.

Example 36 is directed to the medium of example 35, wherein the computing device comprises one of a smartphone, a tablet device, a computer, a virtual reality system, or the wearable device itself.

Example 37 is directed to the medium of example 35, wherein the wearable device comprises one of a wristwatch or a wristband.

Example 38 is directed to the medium of example 37, wherein the wearable device further comprises an ultrasound-on-a-chip device.

Example 39 is directed to the medium of example 38, wherein the wearable device further comprises one or more ultrasound transducers acoustically coupled to an anatomical feature on which the wearable device resides.

Example 40 is directed to the medium of example 39, wherein the one or more ultrasound transducers are configured to operate at a frequency range selected to acquire the ultrasound data from within the anatomical feature.

Example 41 is directed to the medium of example 39, wherein the wearable device further comprises an ultrasound gel pad, configured to be disposed between the one or more ultrasound transducers and the anatomical feature on which the wearable device resides.

Example 42 is directed to the medium of example 38, wherein the wearable device further comprises one or more ultrasound transducers disposed in an outward direction with respect to a first anatomical feature on which the wearable device resides.

Example 43 is directed to the medium of example 42, wherein the one or more ultrasound transducers are configured to operate at a frequency range selected to acquire the ultrasound data from a second anatomical feature on which the wearable device does not reside.

Example 44 is directed to the medium of example 35, wherein the anatomical gesture comprises one of a hand gesture, a finger gesture, a wrist gesture and/or an arm gesture.

Example 45 is directed to a method of interfacing with a computing device, comprising: identifying, with a wearable device, an anatomical gesture using ultrasound data obtained by the wearable device; and causing the computing device to perform a specific function based on the anatomical gesture identified by the wearable device.

Example 46 is directed to the method of example 45, wherein the computing device comprises one of a smartphone, a tablet device, a computer, a virtual reality system, or the wearable device itself.

Example 47 is directed to the method of example 45, wherein the wearable device comprises one of a wristwatch or a wristband.

Example 48 is directed to the method of example 47, wherein the wearable device further comprises an ultrasound-on-a-chip device.

Example 49 is directed to the method of example 48, wherein the wearable device further comprises one or more ultrasound transducers acoustically coupled to an anatomical feature on which the wearable device resides.

Example 50 is directed to the method of example 49, wherein the one or more ultrasound transducers are configured to operate at a frequency range selected to acquire the ultrasound data from within the anatomical feature.

Example 51 is directed to the method of example 49, wherein the wearable device further comprises an ultrasound gel pad, configured to be disposed between the one or more ultrasound transducers and the anatomical feature on which the wearable device resides.

Example 52 is directed to the method of example 48, wherein the wearable device further comprises one or more ultrasound transducers disposed in an outward direction with respect to a first anatomical feature on which the wearable device resides.

Example 53 is directed to the method of example 52, wherein the one or more ultrasound transducers are configured to operate at a frequency range selected to acquire the ultrasound data from a second anatomical feature on which the wearable device does not reside.

Example 54 is directed to the method of example 45, wherein the anatomical gesture comprises one of a hand gesture, a finger gesture, a wrist gesture and/or an arm gesture.

Example 55 is directed to an apparatus to perform gesture recognition for a portable ultrasound device, comprising: a wearable device configured to: obtain ultrasound data corresponding to an anatomical gesture; and identify the anatomical gesture based on the obtained ultrasound data.

Example 56 is directed to the apparatus of example 55, wherein the wearable device comprises one of a wristwatch or a wristband having an ultrasound-on-a-chip.

Example 57 is directed to the apparatus of example 55, wherein the wearable device further comprises one or more position sensors.

Example 58 is directed to the apparatus of example 57, wherein the wearable device further comprises one or more ultrasound transducers acoustically coupled to an anatomical feature on which the wearable device resides.

Example 59 is directed to the apparatus of example 58, wherein the one or more ultrasound transducers are configured to operate at a frequency range selected to acquire the ultrasound data from within the anatomical feature.

Example 60 is directed to the apparatus of example 58, wherein the wearable device further comprises an ultrasound gel pad, configured to be disposed between the one or more ultrasound transducers and the anatomical feature on which the wearable device resides.

Example 61 is directed to the apparatus of example 57, wherein the wearable device further comprises one or more ultrasound transducers disposed in an outward direction with respect to a first anatomical feature on which the wearable device resides.

Example 62 is directed to the apparatus of example 61, wherein the one or more ultrasound transducers are configured to operate at a frequency range selected to acquire the ultrasound data from a second anatomical feature on which the wearable device does not reside.

Example 63 is directed to the apparatus of example 55, wherein the anatomical gesture comprises one of a hand gesture, a finger gesture, a wrist gesture and/or an arm gesture.

Example 64 is directed to a method of performing gesture recognition, comprising: obtaining, with a wearable device, ultrasound data corresponding to an anatomical gesture; and identifying the anatomical gesture based on the obtained ultrasound data.

Example 65 is directed to the method of example 64, wherein the wearable device comprises one of a wristwatch or a wristband.

Example 66 is directed to the method of example 65, wherein the wearable device further comprises an ultrasound-on-a-chip device.

Example 67 is directed to the method of example 66, wherein the wearable device further comprises one or more position sensors.

Example 68 is directed to the method of example 65, wherein the wearable device further comprises one or more ultrasound transducers acoustically coupled to an anatomical feature on which the wearable device resides.

Example 69 is directed to the method of example 68, wherein the one or more ultrasound transducers are configured to operate at a frequency range selected to acquire the ultrasound data from within the anatomical feature.

Example 70 is directed to the method of example 68, wherein the wearable device further comprises an ultrasound gel pad, configured to be disposed between the one or more ultrasound transducers and the anatomical feature on which the wearable device resides.

Example 71 is directed to the method of example 67, wherein the wearable device further comprises one or more ultrasound transducers disposed in an outward direction with respect to a first anatomical feature on which the wearable device resides.

Example 72 is directed to the method of example 71, wherein the one or more ultrasound transducers are configured to operate at a frequency range selected to acquire the ultrasound data from a second anatomical feature on which the wearable device does not reside.

Example 73 is directed to the method of example 64, wherein the anatomical gesture comprises one of a hand gesture, a finger gesture, a wrist gesture and/or an arm gesture.

Example 74 is directed to a non-transitory computer-readable storage medium storing processor-executable instructions that, when executed by at least one processor, cause the at least one processor to: obtain, from a wearable device, ultrasound data corresponding to an anatomical gesture; and identify the anatomical gesture based on the obtained ultrasound data.

Example 75 is directed to the medium of example 74, wherein the wearable device comprises one of a wristwatch or a wristband.

Example 76 is directed to the medium of example 75, wherein the wearable device further comprises an ultrasound-on-a-chip device.

Example 77 is directed to the medium of example 76, wherein the wearable device further comprises one or more position sensors.

Example 78 is directed to a non-transitory computer-readable storage medium of example B24, wherein the wearable device further comprises one or more ultrasound transducers acoustically coupled to an anatomical feature on which the wearable device resides.

Example 79 is directed to the medium of example 79, wherein the one or more ultrasound transducers are configured to operate at a frequency range selected to acquire the ultrasound data from within the anatomical feature.

Example 80 is directed to the medium of example 78, wherein the wearable device further comprises an ultrasound gel pad, configured to be disposed between the one or more ultrasound transducers and the anatomical feature on which the wearable device resides.

Example 81 is directed to the medium of example 77, wherein the wearable device further comprises one or more ultrasound transducers disposed in an outward direction with respect to a first anatomical feature on which the wearable device resides.

Example 82 is directed to the medium of example 81, wherein the one or more ultrasound transducers are configured to operate at a frequency range selected to acquire the ultrasound data from a second anatomical feature on which the wearable device does not reside.

Example 83 is directed to the medium of example 74, wherein the anatomical gesture comprises one of a hand gesture, a finger gesture, a wrist gesture and/or an arm gesture.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having described above several aspects of at least one embodiment, it is to be appreciated various alterations, modifications, and improvements will readily occur to those skilled in the art. Such alterations, modifications, and improvements are intended to be object of this disclosure. Accordingly, the foregoing description and drawings are by way of example only.

What is claimed is:

1. A system for training a wearable device to perform gesture recognition based on ultrasound data, comprising:
a memory circuitry;
a processing circuitry in communication with the memory circuitry, the processing circuitry configured to:
obtain, from the wearable device, ultrasound data generated at a first time in response to performance of an anatomical gesture;
obtain an image of the anatomical gesture from an image capture device on a smartphone or a tablet device separate from the wearable device; and
train, by correlating the image of the anatomical gesture with the ultrasound data generated at the first time in response to performance of the anatomical gesture, a machine learning model accessed by the wearable device to recognize the anatomical gesture from an input of ultrasound data collected at a second time and to output a label of the anatomical gesture in response to the input of ultrasound data collected at the second time.

2. The system of claim 1, wherein the wearable device comprises one of a wristwatch or a wristband configured with an ultrasound-on-a-chip.

3. The system of claim 2, wherein the wearable device further comprises one or more position sensors.

4. The system of claim 3, wherein the one or more position sensors comprise one or more accelerometers, gyroscopes, magnetometers, compasses, and global positioning systems (GPS).

5. The system of claim 3, wherein the processing circuitry is further configured to obtain position data from the one or more position sensors and to train the machine learning model accessed by the wearable device to recognize the anatomical gesture by correlating the position data with the image of the anatomical gesture and the ultrasound data generated at the first time in response to performance of the anatomical gesture.

6. The system of claim 1, wherein the anatomical gesture comprises one of a hand gesture, a finger gesture, a wrist gesture and/or an arm gesture.

7. A method to train a wearable device to perform gesture recognition based on ultrasound data, comprising:
    obtaining, with the wearable device, ultrasound data generated at a first time in response to performance of an anatomical gesture;
    obtaining an image of the anatomical gesture from an image capture device on a smartphone or a tablet device separate from the wearable device; and
    training, by correlating the image of the anatomical gesture with the ultrasound data generated at the first time in response to performance of the anatomical gesture, a machine learning model accessible to the wearable device to recognize the anatomical gesture from an input of ultrasound data collected at a second time and to output a label of the anatomical gesture in response to the input of the ultrasound data collected at the second time.

8. The method of claim 7, wherein the wearable device comprises one of a wristwatch or a wristband.

9. The method of claim 8, wherein the wearable device further comprises an ultrasound-on-a-chip device.

10. The method of claim 9, wherein the wearable device further comprises one or more position sensors.

11. The method of claim 10, wherein the method further comprises obtaining position data from the one or more position sensors, and wherein training the machine learning model accessible to the wearable device to recognize the anatomical gesture comprises training the machine learning model to recognize the anatomical gesture by correlating the position data with the image of the anatomical gesture and the ultrasound data generated at the first time in response to performance of the anatomical gesture.

12. The method of claim 11, wherein the one or more position sensors comprise one or more accelerometers, gyroscopes, magnetometers, compasses, and global positioning systems (GPS).

13. The method of claim 7, wherein the anatomical gesture comprises one of a hand gesture, a finger gesture, a wrist gesture and/or an arm gesture.

14. At least one non-transitory computer-readable storage medium storing processor-executable instructions that, when executed by at least one processor, cause the at least one processor to:
    obtain, from a wearable device, ultrasound data generated at a first time in response to performance of an anatomical gesture;
    obtain an image of the anatomical gesture from an image capture device on a smartphone or a tablet device separate from the wearable device; and
    train, by correlating the image of the anatomical gesture with the ultrasound data generated at the first time in response to performance of the anatomical gesture, a machine learning model accessed by the wearable device to recognize the anatomical gesture from an input of ultrasound data collected at a second time and to output a label of the anatomical gesture in response to the input of the ultrasound data collected at the second time.

15. The at least one non-transitory computer-readable storage medium of claim 14, wherein the wearable device comprises one of a wristwatch or a wristband.

16. The at least one non-transitory computer-readable storage medium of claim 15, wherein the wearable device further comprises an ultrasound-on-a-chip device.

17. The at least one non-transitory computer-readable storage medium of claim 16, wherein the wearable device further comprises one or more position sensors.

18. The at least one non-transitory computer-readable storage medium of claim 17, wherein the one or more position sensors comprise one or more accelerometers, gyroscopes, magnetometers, compasses, and global positioning systems (GPS).

19. The at least one non-transitory computer-readable storage medium of claim 17, wherein the at least one non-transitory computer readable storage medium further stores processor-executable instructions that, when executed by the at least one processor, cause the at least one processor to obtain position data using the one or more position sensors, and to train the machine learning model accessed by the wearable device to recognize the anatomical gesture by correlating the position data with the image of the anatomical gesture and the ultrasound data generated at the first time in response to performance of the anatomical gesture.

20. The at least one non-transitory computer-readable storage medium of claim 14, wherein the anatomical gesture comprises one of a hand gesture, a finger gesture, a wrist gesture and/or an arm gesture.

* * * * *